US011383303B2

(12) United States Patent
Miyashita et al.

(10) Patent No.: US 11,383,303 B2
(45) Date of Patent: Jul. 12, 2022

(54) PRODUCTION METHOD FOR THREE-DIMENSIONAL SHAPED ARTICLE

(71) Applicant: Seiko Epson Corporation, Tokyo (JP)

(72) Inventors: Takeshi Miyashita, Suwa (JP); Eiji Okamoto, Matsumoto (JP); Akihiko Tsunoya, Okaya (JP); Naoko Shima, Shiojiri (JP)

(73) Assignee: Seiko Epson Corporation ( * ) Notice: Subject to any disclaimer, the term of this patent is extended or adjusted under 35 U.S.C. 154(b) by 378 days.

(21) Appl. No.: 16/498,455

(22) PCT Filed: Mar. 27, 2018

(86) PCT No.: PCT/JP2018/012355
§ 371 (c)(1),
(2) Date: Sep. 27, 2019

(87) PCT Pub. No.: WO2018/181275
PCT Pub. Date: Oct. 4, 2018

(65) Prior Publication Data
US 2021/0213533 A1 Jul. 15, 2021

(30) Foreign Application Priority Data
Mar. 31, 2017 (JP) .............................. JP2017-073075

(51) Int. Cl.
B22F 10/28 (2021.01)
B33Y 10/00 (2015.01)
(Continued)

(52) U.S. Cl.
CPC .............. B22F 10/28 (2021.01); B28B 1/001 (2013.01); B29C 64/153 (2017.08); B33Y 10/00 (2014.12);
(Continued)

(58) Field of Classification Search
CPC ...... B22F 10/20; B22F 10/28; B22F 2304/10; C09D 11/037; C09D 11/322; B33Y 70/00; B33Y 10/00; B29C 64/153; B28B 1/001
See application file for complete search history.

(56) References Cited

U.S. PATENT DOCUMENTS

2009/0068376 A1   3/2009   Philippi et al.
2013/0065073 A1   3/2013   Fuwa
(Continued)

FOREIGN PATENT DOCUMENTS

CN   104259459 A   1/2015
CN   105835360 A   8/2016
(Continued)

OTHER PUBLICATIONS

Fateri, Miranda et al., "Experimental Investigation On Selective Laser Melting of Glass", Physics Procedia, Elsevier, Amsterdam, NL, vol. 56, Sep. 9, 2014, pp. 357-364.
(Continued)

Primary Examiner — Michael P Wieczorek
(74) Attorney, Agent, or Firm — Harness, Dickey & Pierce, P.L.C.

(57) ABSTRACT

A method for producing a three-dimensional shaped article by stacking a plurality of layers is provided, and is characterized in that a series of steps including a layer forming step of forming the layer using a composition containing a plurality of particles, and a joining step of joining the particles contained in the layer to one another by irradiating the layer with a laser beam is repeatedly performed, an average particle diameter of the particles is represented by $D_{50}$ and a thickness of the layer formed in the layer forming step is represented by $D_s$, a relation of $D_s/D_{50}<5.0$ is satisfied, and an arithmetic average height Sa of a surface of
(Continued)

the layer in a state where the particles are joined to one another by the joining step is 15 μm or less.

19 Claims, 10 Drawing Sheets

(51) Int. Cl.
    B29C 64/153    (2017.01)
    B28B 1/00      (2006.01)
    B33Y 30/00     (2015.01)
    C09D 11/037    (2014.01)
    C09D 11/322    (2014.01)
    B33Y 70/00     (2020.01)

(52) U.S. Cl.
    CPC ............ B33Y 30/00 (2014.12); C09D 11/037 (2013.01); C09D 11/322 (2013.01); B22F 2304/10 (2013.01); B33Y 70/00 (2014.12)

(56) References Cited

U.S. PATENT DOCUMENTS

| 2015/0104346 A1 | 4/2015 | Nakamura et al. |
| 2016/0221269 A1 | 8/2016 | Okamoto et al. |
| 2017/0014910 A1* | 1/2017 | Ng .................... B22F 1/0059 |
| 2017/0280567 A1 | 9/2017 | Suzuki et al. |
| 2018/0207722 A1* | 7/2018 | Feldmann ............... B22F 10/00 |
| 2020/0093000 A1 | 3/2020 | Suzuki et al. |

FOREIGN PATENT DOCUMENTS

| JP | 2000-336403 A | 12/2000 |
| JP | 2008-184623 A | 8/2008 |
| JP | 2008-540173 A | 11/2008 |
| WO | 2011/149101 A1 | 12/2011 |
| WO | 2016/042657 A1 | 3/2016 |
| WO | 2016/053312 A1 | 4/2016 |

OTHER PUBLICATIONS

JPKruth et al., "Consolidation Phenomena in Laser and Powder-Bed Based Layered Manufacturing", CIRP Annals, Elsevier, BV, vol. 56, No. 2, pp. 730-759.

M. Schmidt et al., "Laser Based Additive Manufacturing in Industry and Academia", CIRP Annals, Elsevier BV, vol. 66, No. 2, Jun. 28, 2020, pp. 561-583.

T. Grimm et al., "Characterization of Typical Surface Effects in Additive Manufacturing With Confocal Microscopy", Surface Topography: Metrology, 2015, pp. 1-13.

* cited by examiner

PRODUCTION METHOD FOR THREE-DIMENSIONAL SHAPED ARTICLE

BACKGROUND

Technical Field

The present invention relates to a production method for a three-dimensional shaped article.

Related Art

Heretofore, production of a three-dimensional shaped article using a composition containing a plurality of particles has been performed. In particular, recently, a stacking method (three-dimensional shaping method), in which model data of a three-dimensional object is divided into a large number of two-dimensional sectional layer data (slice data), and thereafter, while sequentially shaping sectional members (layers) corresponding to the respective two-dimensional sectional layer data, the sectional members are sequentially stacked, whereby a three-dimensional shaped article is formed, has attracted attention.

The stacking method can immediately form a three-dimensional shaped article as long as there is model data of a three-dimensional shaped article to be shaped, and it is not necessary to form a mold or the like prior to shaping, and therefore, it is possible to rapidly form a three-dimensional shaped article at low cost. Further, since the formation is performed by staking layers of thin plate-shaped sectional members one by one, even a complicated object having, for example, an internal structure can be formed as an integrated shaped article without being divided into a plurality of components.

As a production method for a three-dimensional shaped article, there are a method in which a powder is formed into a layer with a squeegee, and thereafter, the layer is irradiated with a laser beam to join the particles to one another, and a method in which a layer is formed using a composition containing particles and a solvent for dispersing the particles, and thereafter, the layer is irradiated with a laser beam to join the particles to one another (see, for example, JP-A-2008-184623).

Such a method had a problem that when a laser beam is irradiated, particles or a molten material thereof is scattered or a void (a pore or a cavity) is formed inside the three-dimensional shaped article to decrease the dimensional accuracy of the three-dimensional shaped article to be finally obtained, or to decrease the strength of the three-dimensional shaped article, or the like, resulting in deterioration of the reliability of the three-dimensional shaped article.

An object of the invention is to provide a production method for a three-dimensional shaped article capable of producing a three-dimensional shaped article having excellent reliability.

SUMMARY

Such an object is achieved by the following invention.

A production method for a three-dimensional shaped article of the invention is a method for producing a three-dimensional shaped article by stacking a plurality of layers, and is characterized in that a series of steps including a layer forming step of forming the layer using a composition containing a plurality of particles, and a joining step of joining the particles contained in the layer to one another by irradiating the layer with a laser beam is repeatedly performed, when an average particle diameter of the particles is represented by $D_{50}$ [μm] and a thickness of the layer formed in the layer forming step is represented by $D_s$ [μm], a relation of $D_s/D_{50}<5.0$ is satisfied, and an arithmetic average height Sa of a surface of the layer in a state where the particles are joined to one another by the joining step is 15 μm or less.

According to this, a production method for a three-dimensional shaped article capable of producing a three-dimensional shaped article having excellent reliability can be provided.

In the production method for a three-dimensional shaped article of the invention, it is preferred that a maximum height Sz of a surface of the layer in a state where the particles are joined to one another by the joining step is 250 μm or less.

According to this, the dimensional accuracy of the three-dimensional shaped article can be further improved.

In the production method for a three-dimensional shaped article of the invention, it is preferred that the layer is formed by ejecting the composition.

According to this, a three-dimensional shaped article forming composition can be applied in a pattern corresponding to the cross-sectional shape or the like of a three-dimensional shaped article to be produced, and a three-dimensional shaped article having a finer structure can also be favorably produced. In addition, waste of the three-dimensional shaped article forming composition can be suppressed, and further, recovery of the three-dimensional shaped article forming composition or the like that was not used for producing the three-dimensional shaped article can be omitted or simplified.

In the production method for a three-dimensional shaped article of the invention, it is preferred that the layer is formed by flattening the composition with a flattening unit.

According to this, the number of scanning treatments for forming the layer in which a joined portion is provided can be reduced, and the productivity of the three-dimensional shaped article can be further improved. In addition, even when a single type of composition (three-dimensional shaped article producing composition) is used, even a three-dimensional shaped article having a complicated shape can be favorably produced. Further, by using a single type of three-dimensional shaped article producing composition, the three-dimensional shaped article producing composition (particles) that was not used for forming the joined portion can be easily recovered and subjected to recycling.

In the production method for a three-dimensional shaped article of the invention, it is preferred that the thickness $D_s$ of the layer formed in the layer forming step is 5 μm or more and 300 μm or less.

According to this, while improving the productivity of the three-dimensional shaped article, the reliability (particularly, dimensional accuracy, strength, etc.) of the three-dimensional shaped article can be further improved.

In the production method for a three-dimensional shaped article of the invention, it is preferred that the average particle diameter $D_{50}$ of the particles is 0.1 μm or more and less than 50 μm.

According to this, while further improving the productivity of the three-dimensional shaped article, the reliability of the three-dimensional shaped article can be further improved.

DETAILED DESCRIPTION

Hereinafter, preferred embodiments will be described in detail with reference to the accompanying drawings.
Production Method for Three-Dimensional Shaped Article
First, a production method for a three-dimensional shaped article of the invention will be described.

First Embodiment

FIGS. 1 to 10 are vertical sectional views schematically showing steps of a production method for a three-dimensional shaped article of a first embodiment of the invention. FIG. is a flowchart showing the production method for a three-dimensional shaped article of the first embodiment of the invention.

Figure 1:
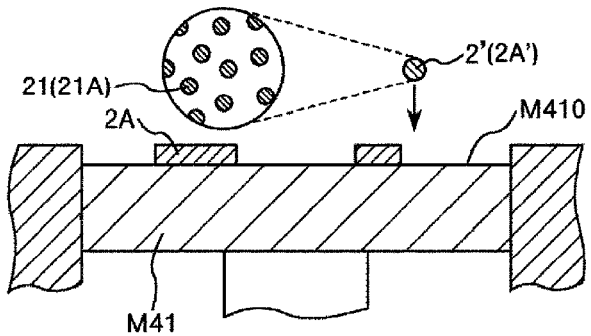
FIG. 1 is a vertical sectional view schematically showing a step (first pattern forming step (layer forming step)) of a production method for a three-dimensional shaped article of a first embodiment of the invention.
Figure 2:
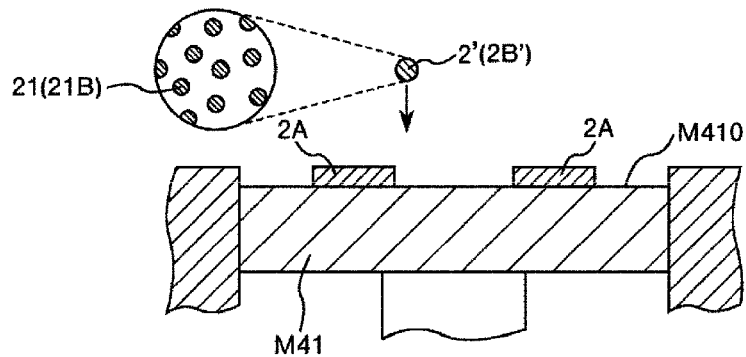
FIG. 2 is a vertical sectional view schematically showing a step (second pattern forming step (layer forming step)) of the production method for a three-dimensional shaped article of the first embodiment of the invention.
Figure 3:
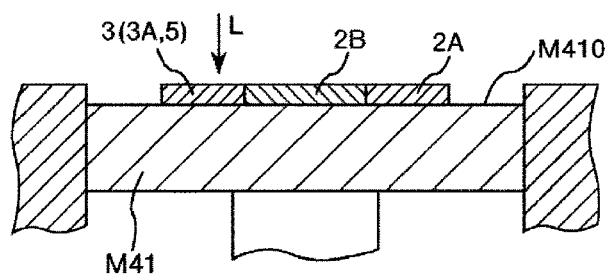
FIG. 3 is a vertical sectional view schematically showing a step (joining step (first joining step)) of the production method for a three-dimensional shaped article of the first embodiment of the invention.
Figure 4:
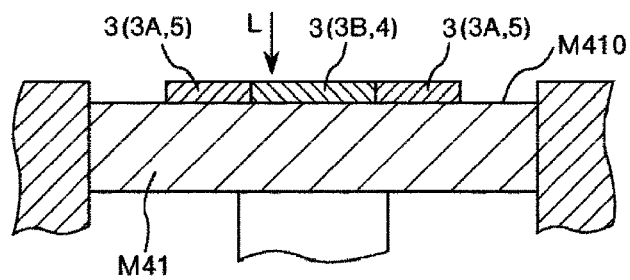
FIG. 4 is a vertical sectional view schematically showing a step (joining step (second joining step)) of the production method for a three-dimensional shaped article of the first embodiment of the invention.
Figure 5:
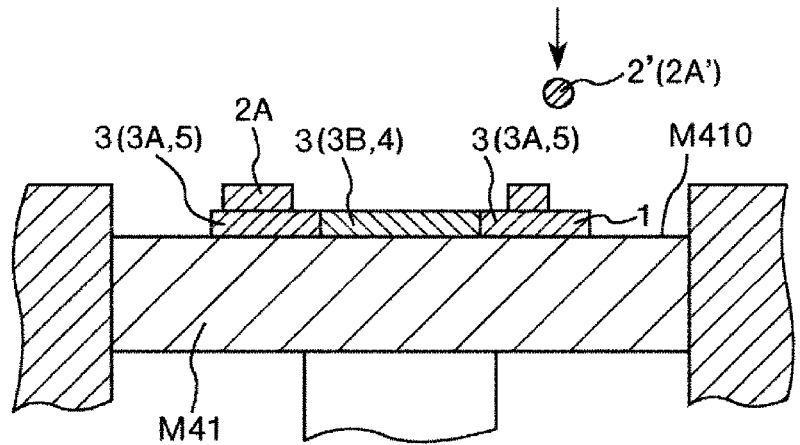
FIG. 5 is a vertical sectional view schematically showing a step (first pattern forming step (layer forming step)) of the production method for a three-dimensional shaped article of the first embodiment of the invention.
Figure 6:
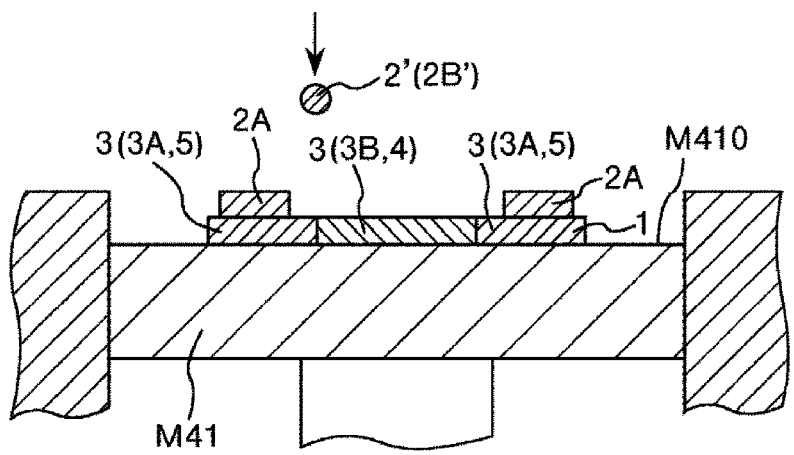
FIG. 6 is a vertical sectional view schematically showing a step (second pattern forming step (layer forming step)) of the production method for a three-dimensional shaped article of the first embodiment of the invention.
Figure 7:
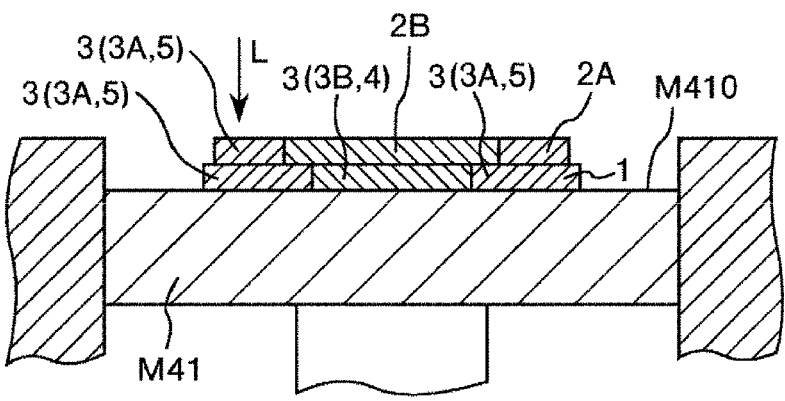
FIG. 7 is a vertical sectional view schematically showing a step (joining step (first joining step)) of the production method for a three-dimensional shaped article of the first embodiment of the invention.
Figure 8:
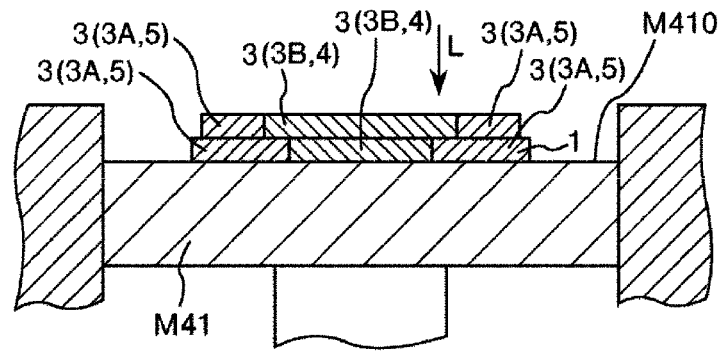
FIG. 8 is a vertical sectional view schematically showing a step (joining step (second joining step)) of the production method for a three-dimensional shaped article of the first embodiment of the invention.
Figure 9:
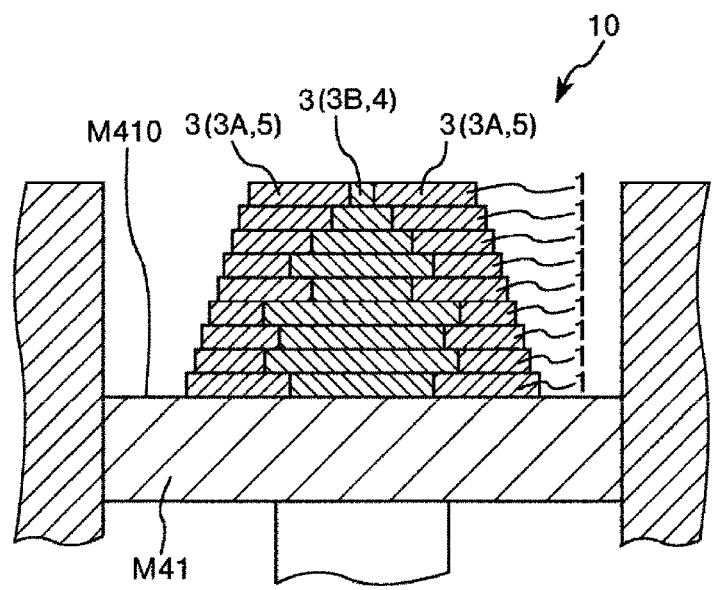
FIG. 9 is a vertical sectional view schematically showing a step of the production method for a three-dimensional shaped article of the first embodiment of the invention.

A production method for a three-dimensional shaped article 10 of this embodiment is a method for producing the three-dimensional shaped article 10 by stacking a plurality of layers 1, and a series of steps including a layer forming step (see FIGS. 1, 2, 5, and 6) of forming the layer 1 using a three-dimensional shaped article producing composition (composition) 2' containing a plurality of particles 21, and a joining step (see FIGS. 3, 4, 7, and 8) of joining the particles 21 contained in the layer 1 to one another by irradiating the layer 1 with a laser beam L is repeatedly performed (see FIG. 9).

Then, when an average particle diameter of the particles 21 is represented by $D_{50}$ [μm] and a thickness of the layer 1 formed in the layer forming step is represented by $D_s$ [μm], a relation of $D_s/D_{50}<5.0$ is satisfied, and an arithmetic average height Sa (ISO 25178) of a surface of the layer 1 in a state where the particles 21 are joined to one another by the joining step is 15 μm or less.

According to this, a decrease in the dimensional accuracy of the three-dimensional shaped article 10, a decrease in the strength of the three-dimensional shaped article 10, or the like due to scattering of the particles 21 or a molten material thereof (hereinafter also simply referred to as "the particles 21 or the like") or formation of a void (a pore or a cavity) inside the three-dimensional shaped article 10 can be effectively prevented, and a production method for the three-dimensional shaped article 10 capable of producing the three-dimensional shaped article 10 having excellent reliability can be provided.

More specifically, in the related art, there was a problem that when a layer containing a plurality of particles is irradiated with a laser beam, due to the energy thereof, the particles are sometimes flicked out from the original position in the layer or a liquid pool of the molten material of the particles (molten pool) undulates, and the molten material is sometimes flicked out accompanying the scanning of a laser beam or the like, and this causes undesirable irregularities in the surface of the layer after it is irradiated with a laser beam, and the dimensional accuracy of the three-dimensional shaped article to be finally obtained is deteriorated. In addition, there was a problem that due to the adhesion of the flicked out particles or the like to another site in the layer, or the like, a void (a pore or a cavity) is formed inside the three-dimensional shaped article to decrease the strength of the three-dimensional shaped article. For the above reasons, the reliability of the three-dimensional shaped article was low. On the other hand, the invention is characterized in that the average particle diameter $D_{50}$ of the particles and the thickness $D_s$ of the layer formed in the layer forming step satisfy a predetermined relation ($D_s/D_{50}<5.0$), and also the arithmetic average height Sa of the surface of the layer formed by the joining step (the layer in a state where the particles are joined to one another by the joining step) is a predetermined value or less (15 µm or less), therefore, the occurrence of a problem as described above can be prevented. Note that the condition for the arithmetic average height Sa of the surface of the layer formed by the joining step as described above may be satisfied in at least a region corresponding to an entity portion of the three-dimensional shaped article to be produced. For example, when a support portion 5 is formed as in this embodiment, the condition for the arithmetic average height Sa as described above may not be satisfied in a region corresponding to the support portion 5, however, it is preferred that the condition for the arithmetic average height Sa as described above is satisfied in both of the region corresponding to the entity portion 4 and the region corresponding to the support portion 5. According to this, an effect as described above is more remarkably exhibited.

In the invention, the average particle diameter refers to a volume-based average particle diameter and can be determined by, for example, subjecting a dispersion liquid obtained by adding a sample to methanol and dispersing the sample therein for 3 minutes with an ultrasonic disperser to measurement by a particle size distribution analyzer employing a Coulter counter method (model TA-II, manufactured by COULTER ELECTRONICS INS) using an aperture of 50 µm.

On the other hand, when the above-mentioned condition is not satisfied, an excellent effect as described above is not obtained.

For example, when the ratio ($D_s/D_{50}$) of the thickness $D_s$ of the layer to the average particle diameter $D_{50}$ of the particles is too large, scattering of the particles or the like when being irradiated with a laser beam or generation of a void (a pore or a cavity) inside the three-dimensional shaped article is likely to occur. In particular, when the value of $D_s/D_{50}$ is large due to a large value of $D_s$, it becomes difficult to produce a precise three-dimensional shaped article because of the thickness of the layer in the thickness direction (height direction), and as a result, the dimensional accuracy of the three-dimensional shaped article is deteriorated. Further, when the value of $D_s/D_{50}$ is large due to a small value of $D_{50}$, scattering of the particles or the like when being irradiated with a laser beam or generation of a void (a pore or a cavity) inside the three-dimensional shaped article as described above becomes more prominent. In addition, the fluidity of the three-dimensional shaped article producing composition is decreased, and the ease of handling of the three-dimensional shaped article producing composition is decreased, and also the productivity of the three-dimensional shaped article is decreased. Further, when the value of $D_{50}$ is particularly small, aggregation of the particles in the three-dimensional shaped article producing composition is likely to occur, and undesirable irregularities in the surface of the layer are likely to occur at a stage before irradiation with a laser beam. As a result, the dimensional accuracy of the three-dimensional shaped article is particularly deteriorated also by together with the effect of scattering or the like of the particles or the like when being irradiated with a laser beam.

Further, when the arithmetic average height Sa of the surface of the layer in a state where the particles are joined to one another by the joining step is too large, irregularities present in the surface of the layer have a large effect also on the shape of the layer to be formed in an upper face of the layer, and the dimensional accuracy of the three-dimensional shaped article to be finally obtained is deteriorated.

As described above, when the average particle diameter of the particles 21 is represented by $D_{50}$ [µm] and the thickness of the layer 1 formed in the layer forming step is represented by $D_s$ [µm], a relation of $D_s/D_{50}<5.0$ may be satisfied, however, it is preferred to satisfy a relation of $1.0<D_s/D_{50}<4.0$, more preferred to satisfy a relation of $1.2<D_s/D_{50}<3.5$, further more preferred to satisfy a relation of $1.4<D_s/D_{50}<3.0$. According to this, an effect as described above is more remarkably exhibited.

Further, the arithmetic average height Sa of the surface of the layer 1 in a state where the particles 21 are joined to one another by the joining step may be 15 µm or less, but is preferably 11 µm or less, more preferably 8.0 µm or less, further more preferably more than 0 µm and 5.0 µm or less. According to this, an effect as described above is more remarkably exhibited.

There are various factors to determine a surface state (an arithmetic average height Sa, or the like) of the layer 1 subjected to the joining step, and the configuration of the three-dimensional shaped article producing composition 2' (more specifically, for example, the constituent material, the particle diameter, the particle size distribution, or the like of the particles 21), the thickness of the layer 1 to be formed in the layer forming step, and the irradiation condition of the laser beam L (for example, the type of the laser beam L, the beam diameter of the laser beam L, the scanning speed, the laser output, or the like) are exemplified.

Further, in this embodiment, as the three-dimensional shaped article producing composition 2', a composition containing, in addition to the particles 21, a solvent functioning as a dispersion medium for dispersing the particles 21 is used, and in the series of steps including the layer forming step and the joining step, a solvent removing step is included between the layer forming step and the joining step. According to this, the fluidity of the three-dimensional shaped article producing composition 2' is made favorable, and the ease of handling of the three-dimensional shaped article producing composition 2' and the easiness of formation of the layer 1 can be improved. In addition, the flatness of the layer 1 to be formed can be made more favorable.

Incidentally, in this description, the solvent is a liquid (dispersion medium) capable of dispersing particles and refers to a volatile liquid.

Hereinafter, the respective steps will be described in detail.

Layer Forming Step

In this embodiment, the layer 1 is formed by ejecting the three-dimensional shaped article producing composition 2'. In other words, in this embodiment, the layer 1 is formed by an ejection method.

According to this, the three-dimensional shaped article producing composition 2' can be applied in a pattern corresponding to the cross-sectional shape of the three-dimensional shaped article 10 to be produced, and the three-dimensional shaped article 10 having a finer structure can also be favorably produced. In addition, the applied amount of the three-dimensional shaped article producing composition 2' in each layer 1 can be favorably adjusted according to the cross-sectional area of the three-dimensional shaped article 10 to be produced, and the used amount of the three-dimensional shaped article producing composition 2' can be suppressed. As a result, waste of the three-dimensional shaped article producing composition 2' can be suppressed, and also recovery of the three-dimensional shaped article producing composition 2' or the like that was not used for producing the three-dimensional shaped article 10 can be omitted or simplified. Such an effect is more remarkably exhibited when the cross-sectional area of the three-dimensional shaped article 10 to be produced is particularly smaller than the area of a stage M41 (for example, when the cross-sectional area of the three-dimensional shaped article 10 to be produced is one-tenth or less of the area of the stage M41, or the like).

Incidentally, in this description, the ejection method refers to a method in which a pattern corresponding to a layer is formed by ejecting the composition (three-dimensional shaped article producing composition) in a given pattern, and is distinguished from a method in which a layer is formed by flattening the supplied composition with a squeegee, a roller, or the like (a method of the below-mentioned second embodiment) or the like.

Further, in the production method of this embodiment, the layer forming step is performed using an entity portion forming composition 2B' (a composition containing particles (dispersoids) 21B) used for forming the entity portion 4 of the three-dimensional shaped article 10 and a support portion forming composition 2A' (a composition containing particles (dispersoids) 21A) used for forming a support portion (a supporting portion or a support material) 5 supporting a portion to become the entity portion 4 as the three-dimensional shaped article producing composition 2'. Then, the step includes a first pattern forming step (support portion pattern forming step) of forming a first pattern (support portion pattern) 2A by ejecting the support portion forming composition (composition) 2A' and a second pattern forming step (entity portion pattern forming step) of forming a second pattern (entity portion pattern) 2B by ejecting the entity portion forming composition (composition) 2B'.

In this manner, by forming not only a portion corresponding to the entity portion 4 of the three-dimensional shaped article 10, but also the support portion 5, undesirable deformation of the portion corresponding to the entity portion 4 can be more effectively prevented, and the dimensional accuracy of the three-dimensional shaped article 10 can be further improved. In addition, even the three-dimensional shaped article 10 having a more complicated shape can be favorably produced.

Then, at least one of the entity portion forming composition 2B' and the support portion forming composition 2A' as the three-dimensional shaped article producing composition 2' satisfies the above-mentioned condition (a relation of $D_s/D_{50} < 5.0$) with the layer 1 formed in the layer forming step.

According to this, the reliability of the three-dimensional shaped article 10 can be further improved.

It is sufficient that at least one of the entity portion forming composition 2B' and the support portion forming composition 2A' as the three-dimensional shaped article producing composition 2' satisfies the above-mentioned condition, however, in the following description, a case where both of the entity portion forming composition 2B' and the support portion forming composition 2A' satisfy the above-mentioned condition will be mainly described.

First Pattern Forming Step

In the first pattern forming step, the first pattern 2A is formed by ejecting the support portion forming composition 2A', for example, on a plane M410 of a stage M41.

By forming the first pattern 2A by ejecting the support portion forming composition 2A' in this manner, even a pattern having a fine shape or a complicated shape can be favorably formed.

An ejection method for the support portion forming composition 2A' is not particularly limited, and the ejection can also be performed using, for example, an inkjet apparatus or the like, but it is preferably ejected by a dispenser.

In this manner, by performing ejection of the support portion forming composition 2A' using a dispenser, even the support portion forming composition 2A' having a high viscosity can be favorably supplied (ejected), and dripping or the like of the support portion forming composition 2A' after the support portion forming composition 2A' comes in contact with a target site can be more effectively prevented. As a result, the dimensional accuracy of the three-dimensional shaped article 10 to be finally obtained can be further improved. In addition, by using the support portion forming composition 2A' having a high viscosity, the layer 1 having a relatively large thickness can be easily formed, and the productivity of the three-dimensional shaped article 10 can be further improved.

The support portion forming composition 2A' may be in the form of, for example, a paste.

The viscosity of the support portion forming composition 2A' in this step is preferably 100 mPa·s or more and 1,000,000 mPa·s or less, more preferably 500 mPa·s or more and 100,000 mPa·s or less, further more preferably 1,000 mPa·s or more and 20,000 mPa·s or less.

According to this, for example, the ejection stability of the support portion forming composition 2A' can be further improved, and also the composition is suitable for forming the layer 1 having a moderate thickness, and the productivity of the three-dimensional shaped article 10 can be further improved. In addition, the excessive wet-spreading of the support portion forming composition 2A' after coming in contact with the adherend is more effectively prevented, and the dimensional accuracy of the three-dimensional shaped article 10 to be finally obtained can be further improved.

Incidentally, in this description, the viscosity refers to a value measured using a rheometer under the condition of a shear rate of 10 $[s^{-1}]$ unless otherwise specified.

In this step, the support portion forming composition 2A' may be ejected in the form of a continuous body or as a plurality of liquid droplets, but is preferably ejected as a plurality of liquid droplets.

According to this, for example, it can also be more favorably applied to the production of the three-dimensional shaped article 10 having a fine structure, and the dimensional accuracy of the three-dimensional shaped article 10 can be further improved.

When the support portion forming composition 2A' is ejected as a plurality of liquid droplets in this step, the volume per liquid droplet to be ejected is preferably 1 pL or more and 100,000 pL (100 nL) or less, more preferably 10 pL or more and 50,000 pL (50 nL) or less.

According to this, for example, it can also be more favorably applied to the production of the three-dimensional shaped article 10 having a fine structure, and the dimensional accuracy of the three-dimensional shaped article 10 can be further improved, and also the productivity of the three-dimensional shaped article 10 can be further improved.

In the production of the three-dimensional shaped article 10, as the support portion forming composition 2A', a plurality of types of compositions may be used.

Incidentally, the support portion forming composition 2A' will be described in detail later.

Second Pattern Forming Step

In the second pattern forming step, the second pattern 2B is formed by ejecting the entity portion forming composition 2B'.

By forming the second pattern 2B by ejecting the entity portion forming composition 2B' in this manner, even a pattern having a fine shape or a complicated shape can be favorably formed.

Particularly, in this embodiment, the entity portion forming composition 2B' is ejected in a region surrounded by the first pattern 2A so that the entire periphery of the second pattern 2B is in contact with the first pattern 2A.

According to this, the dimensional accuracy of the three-dimensional shaped article 10 to be finally obtained can be further improved.

An ejection method for the entity portion forming composition 2B' is not particularly limited, and the ejection can also be performed using, for example, an inkjet apparatus or the like, but it is preferably ejected by a dispenser.

In this manner, by performing ejection of the entity portion forming composition 2B' using a dispenser, even the entity portion forming composition 2B' having a high viscosity can be favorably supplied (ejected), and dripping or the like of the entity portion forming composition 2B' after the entity portion forming composition 2B' comes in contact with a target site can be more effectively prevented. As a result, the dimensional accuracy of the three-dimensional shaped article 10 to be finally obtained can be further improved. In addition, by using the entity portion forming composition 2B' having a high viscosity, the layer 1 having a relatively large thickness can be easily formed, and the productivity of the three-dimensional shaped article 10 can be further improved.

The entity portion forming composition 2B' may be in the form of, for example, a paste.

The viscosity of the entity portion forming composition 2B' in this step is preferably 100 mPa·s or more and 1,000,000 mPa·s or less, more preferably 500 mPa·s or more and 100,000 mPa·s or less, further more preferably 1,000 mPa·s or more and 20,000 mPa·s or less.

According to this, for example, the ejection stability of the entity portion forming composition 2B' can be further improved, and also the composition is suitable for forming the layer 1 having a moderate thickness, and the productivity of the three-dimensional shaped article 10 can be further improved. In addition, the excessive wet-spreading of the entity portion forming composition 2B' after coming in contact with the adherend is more effectively prevented, and the dimensional accuracy of the three-dimensional shaped article 10 to be finally obtained can be further improved.

In this step, the entity portion forming composition 2B' may be ejected in the form of a continuous body or as a plurality of liquid droplets, but is preferably ejected as a plurality of liquid droplets.

According to this, for example, it can also be more favorably applied to the production of the three-dimensional shaped article 10 having a fine structure, and the dimensional accuracy of the three-dimensional shaped article 10 can be further improved.

When the entity portion forming composition 2B' is ejected as a plurality of liquid droplets in this step, the volume per liquid droplet to be ejected is preferably 1 pL or more and 100,000 pL (100 nL) or less, more preferably 10 pL or more and 50,000 pL (50 nL) or less.

According to this, for example, it can also be more favorably applied to the production of the three-dimensional shaped article 10 having a fine structure, and the dimensional accuracy of the three-dimensional shaped article 10 can be further improved, and also the productivity of the three-dimensional shaped article 10 can be further improved.

In the production of the three-dimensional shaped article 10, as the entity portion forming composition 2B', a plurality of types of compositions may be used.

By doing this, for example, materials can be combined according to the properties required for the respective portions of the three-dimensional shaped article 10, and therefore, the properties (including appearance, functionality (for example, elasticity, toughness, heat resistance, corrosion resistance, or the like), etc.) of the three-dimensional shaped article 10 as a whole can be further improved.

Incidentally, the entity portion forming composition 2B' will be described in detail later.

By performing the first pattern forming step and the second pattern forming step as described above, the layer 1 having the first pattern 2A and the second pattern 2B is formed. In other words, the layer forming step includes the first pattern forming step and the second pattern forming step.

The thickness $D_s$ of the layer 1 formed in the layer forming step is not particularly limited, but is preferably 5 μm or more and 300 μm or less, more preferably 10 μm or more and 200 μm or less, further more preferably 20 μm or more and 100 μm or less.

According to this, while improving the productivity of the three-dimensional shaped article 10, the reliability (particularly dimensional accuracy, strength, etc.) of the three-dimensional shaped article 10 can be further improved.

Solvent Removing Step

In the solvent removing step, the solvent contained in the layer 1 is removed.

According to this, the fluidity of the layer 1 is decreased, and the stability of the shape of the layer 1 is improved. In addition, by performing this step, undesirable deformation involved in sudden volatilization (such as explosive boil) or the like of the solvent in the subsequent joining step can be effectively prevented. As a result, the three-dimensional shaped article 10 having excellent reliability (for example, dimensional accuracy, strength, etc.) can be more reliability obtained, and also the productivity of the three-dimensional shaped article 10 can be further improved.

As a method for removing the solvent, for example, heating of the layer 1, irradiation of the layer 1 with an infrared ray, placement of the layer 1 under reduced pressure, supply of a gas with a low liquid component content ratio (for example, a gas having a relative humidity of 30% or less) such as dry air, etc. are exemplified. Further, two or more methods selected from these may be performed in combination.

Incidentally, this step may be performed concurrently with, for example, the above-mentioned layer forming step. More specifically, for example, before a predetermined pattern (layer 1) is completed by ejecting the three-dimensional shaped article producing composition 2', a treatment for removing the solvent from the ejected three-dimensional shaped article producing composition 2' may be performed. Alternatively, the solvent removing step (first solvent removing step) may be performed for the first pattern 2A completed in the first pattern forming step, and thereafter, the solvent removing step (second solvent removing step) may be performed for the second pattern 2B completed in the second pattern forming step.

Further, in this step, it is not necessary to completely remove the solvent contained in the layer 1.

The content ratio of the solvent in the layer 1 after this step is preferably 0.1 mass % or more and 25 mass % or less, more preferably 0.5 mass % or more and 20 mass % or less.

According to this, undesirable deformation involved in sudden volatilization (such as explosive boil) or the like of the solvent in the later step can be effectively prevented, and also formation of a void (a pore or a cavity) inside the three-dimensional shaped article 10 can be more effectively prevented, and further, the three-dimensional shaped article 10 having excellent reliability (for example, dimensional accuracy, strength, etc.) can be more reliably obtained, and also the productivity of the three-dimensional shaped article 10 can be further improved.

Joining Step

In the joining step, the layer 1 is irradiated (scanned) with a laser beam L (see FIGS. 3, 4, 7, and 8).

According to this, the particles 21 contained in the three-dimensional shaped article producing composition 2' are joined to one another, thereby forming a joined portion 3. By forming the joined portion 3 in this manner, undesirable migration of the particles 21 thereafter is prevented, and the dimensional accuracy and strength of the three-dimensional shaped article 10 can be improved. Further, in the joined portion 3 formed in this manner, generally, the particles 21 are joined to one another with a sufficient joining strength. Further, in this step, when the layer 1 in which the joined portion 3 is formed is present at the lower side of the layer 1 to be irradiated with the laser beam L, the joined portion 3 of the layer 1 at the lower side and the joined portion 3 to be newly formed are generally joined to each other. As a result, the mechanical strength of the three-dimensional shaped article 10 to be finally obtained can be improved.

Further, by using the laser beam L, energy can be applied to a desired site with high selectivity, and therefore, it is advantageous in terms of improvement of the dimensional accuracy of the three-dimensional shaped article 10 and is also advantageous in terms of improvement of the productivity of the three-dimensional shaped article 10. Further, the energy efficiency can be improved, and therefore, it is also advantageous in terms of saving energy.

Further, in this step, by the irradiation with the laser beam L, the particles 21 are joined, and also unnecessary components other than the particles 21 can be removed. For example, the binder, the solvent, and the like can be removed, and these components can be effectively prevented from remaining in the joined portion 3 to be formed.

Particularly, in this embodiment, the joining step is performed so that the arithmetic average height Sa of the surface of the layer 1 in a state where the particles 21 are joined to one another by this step (joining step) is 15 µm or less, and therefore, the flatness of the surface of the layer 1 in which the joined portion 3 is formed can be enhanced. Further, by using the three-dimensional shaped article producing composition 2' satisfying the above-mentioned condition (a relation of $D_s/D_{50}<5.0$) with the layer 1 formed in the layer forming step, undesirable scattering of the particles 21 or the like due to energy of the irradiated laser beam L is effectively prevented. As a result, the three-dimensional shaped article 10 having excellent reliability (dimensional accuracy, strength, etc.) is obtained.

The joining form varies depending on the constituent material or the like of the particles 21, but for example, fusion, sintering, melt-solidification, etc. are exemplified.

Further, in the production method of this embodiment, the joining step includes a first joining step of joining the particles 21A to one another by irradiating the first pattern 2A formed using the support portion forming composition 2A' with the laser beam L, thereby forming a joined portion (first joined portion) 3A and a second joining step of joining the particles 21B to one another by irradiating the second pattern 2B formed using the entity portion forming composition 2B' with the laser beam L, thereby forming a joined portion (second joined portion) 3B. In other words, in this embodiment, the joined portion (second joined portion) 3B is formed in a portion to become the entity portion 4 of the three-dimensional shaped article 10 and also the joined portion (first joined portion) 3A functioning as the support portion 5 in the production process for the three-dimensional shaped article 10 is formed. By performing a joining treatment not only for the second pattern 2B to become the entity portion 4 of the three-dimensional shaped article 10, but also for the first pattern 2A in this manner, the stability of the shape of the support portion 5 supporting the portion to become the entity portion 4 can be further improved, and the occurrence of undesirable deformation in the production process for the three-dimensional shaped article 10 can be more effectively prevented, and the dimensional accuracy of the three-dimensional shaped article 10 to be finally obtained can be further improved.

As a laser that can be used in this step, for example, solid lasers such as a ruby laser, a YAG laser, a Nd:YAG laser, a titanium:sapphire laser, and a semiconductor laser; liquid lasers such as a dye laser; gas lasers such as a neutral atom laser (a helium neon laser or the like), an ion laser (an argon ion laser or the like), a molecular laser (a carbon dioxide gas laser, a nitrogen laser, or the like), an excimer laser, and a metal-vapor laser (a helium cadminium laser or the like); a free electron laser; chemical lasers such as an oxygen-iodine chemical laser and a hydrogen fluoride laser; a fiber laser, etc. are exemplified.

The thickness of the layer 1 having the joined portion 3 is not particularly limited, but is preferably 5 µm or more and 300 µm or less, more preferably 10 µm or more and 200 or less, further more preferably 20 µm or more and 100 µm or less.

According to this, while improving the productivity of the three-dimensional shaped article 10, the reliability (dimensional accuracy, strength, etc.) of the three-dimensional shaped article 10 can be further improved.

Incidentally, for example, the irradiation conditions of the laser beam L (the type of the laser beam L, the irradiation intensity, etc.) may be adjusted so as to be different at the respective sites in the layer 1.

More specifically, for example, the irradiation conditions of the laser beam L (irradiation energy, etc.) may be adjusted such that the joining strength of the particles 21A in the joined portion 3A (support material 5) is smaller than the joining strength of the particles 21B in the joined portion 3B (entity portion 4). According to this, the removal of the support material 5 in the support material removing step can be more efficiently performed, so that the productivity of the three-dimensional shaped article 10 can be further improved, and also the occurrence of a defect in the three-dimensional shaped article 10 in the support material removing step can be more effectively prevented, and the reliability (dimensional accuracy, etc.) of the three-dimensional shaped article 10 to be finally obtained can be further improved.

As described above, the surface of the layer 1 in a state where the particles 21 are joined to one another by the joining step (the surface of the layer 1 after the joining step) may satisfy the condition for the arithmetic average height Sa (ISO 25178) as described above, but preferably further satisfies the following conditions.

That is, a maximum height Sz (ISO 25178) of the surface of the layer 1 in a state where the particles 21 are joined to one another by the joining step is preferably 250 μm or less, more preferably 200 μm or less, further more preferably more than 0 μm and 150 μm or less.

According to this, the dimensional accuracy of the three-dimensional shaped article 10 to be finally obtained can be further improved.

Further, a root mean square height Sq (ISO 25178) of the surface of the layer 1 in a state where the particles 21 are joined to one another by the joining step is preferably 30 or less, more preferably 20 μm or less, further more preferably more than 0 μm and 15 μm or less.

According to this, the dimensional accuracy of the three-dimensional shaped article 10 to be finally obtained can be further improved.

Further, a skewness (degree of asymmetry) Ssk (ISO 25178) of the surface of the layer 1 in a state where the particles 21 are joined to one another by the joining step is preferably −1.0 or more and 2.0 or less, more preferably −0.5 or more and 1.5 or less, further more preferably −0.3 or more and 1.0 or less.

According to this, the dimensional accuracy of the three-dimensional shaped article 10 to be finally obtained can be further improved.

Further, a kurtosis (degree of peakedness) Sku (ISO 25178) of the surface of the layer 1 in a state where the particles 21 are joined to one another by the joining step is preferably 15 or less, more preferably 10 or less, further more preferably more than 0 and 7.0 or less.

According to this, the dimensional accuracy of the three-dimensional shaped article 10 to be finally obtained can be further improved.

Further, a maximum height of peaks Sp (ISO 25178) of the surface of the layer 1 in a state where the particles 21 are joined to one another by the joining step is preferably 200 μm or less, more preferably 150 μm or less, further more preferably more than 0 μm and 70 μm or less.

According to this, the dimensional accuracy of the three-dimensional shaped article 10 to be finally obtained can be further improved.

Further, a maximum height of valleys Sv (ISO 25178) of the surface of the layer 1 in a state where the particles 21 are joined to one another by the joining step is preferably 150 μm or less, more preferably 100 μm or less, further more preferably more than 0 μm and 50 μm or less.

According to this, the dimensional accuracy of the three-dimensional shaped article 10 to be finally obtained can be further improved.

The conditions for the surface of the layer 1 after the joining step as described above (maximum height Sz, skewness (degree of asymmetry) Ssk, kurtosis (degree of peakedness) Sku, maximum height of peaks Sp, and maximum height of valleys Sv) are preferably satisfied in a region corresponding to the entity portion 4 of the three-dimensional shaped article to be produced, but more preferably satisfied in both of a region corresponding to the entity portion 4 and a region corresponding to the support portion 5. According to this, an effect as described above is more remarkably exhibited.

Support Portion Removing Step

Figure 10:
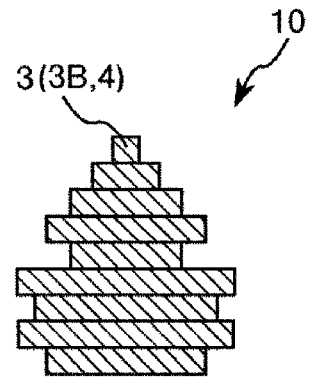
FIG. 10 is a vertical sectional view schematically showing a step (support portion removing step) of the production method for a three-dimensional shaped article of the first embodiment of the invention.

In this embodiment, after repeatedly performing a series of steps including the layer forming step (the first pattern forming step and the second pattern forming step), the solvent removing step, and the joining step (see FIG. 9), as a post-treatment step, the support material 5 is removed (see FIG. 10). By doing this, the three-dimensional shaped article 10 is taken out.

As a specific method of this step, for example, a method in which at least a part of the support material 5 is dissolved, a method in which the support material 5 is destroyed by smashing or the like, etc. are exemplified.

Figure 11:
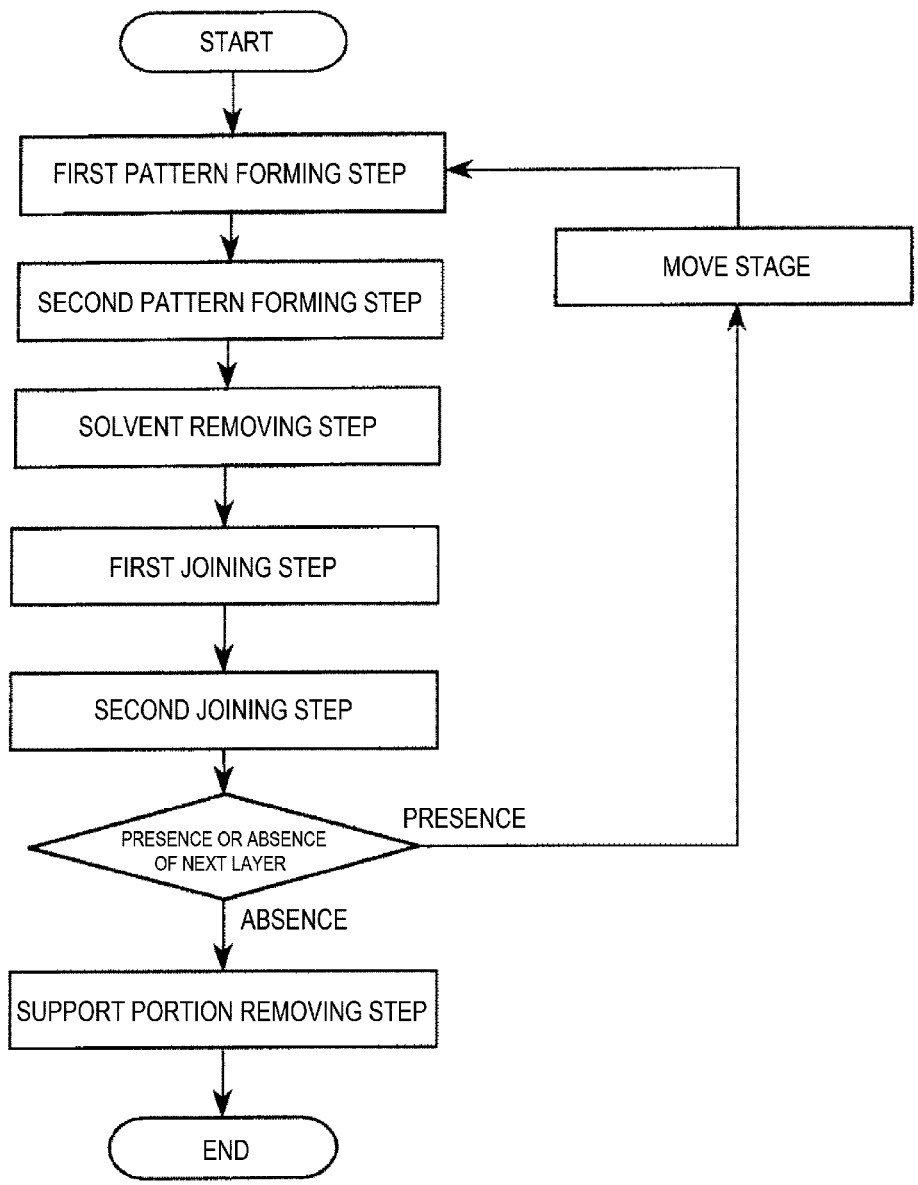
FIG. 11 is a flowchart showing the production method for a three-dimensional shaped article of the first embodiment of the invention.

The production method for the three-dimensional shaped article 10 as described above can be summarized in a flowchart as shown in FIG. 11.

In the production of the three-dimensional shaped article 10, a series of steps including the layer forming step (the first pattern forming step and the second pattern forming step), the solvent removing step, and the joining step is repeatedly performed as many times as specified, whereby a stacked body in which a plurality of layers 1 are stacked is obtained.

That is, it is determined whether a new layer 1 should be formed on the already formed layer 1, and when there is a layer 1 that should be formed, a new layer 1 is formed, and when there is no layer 1 that should be formed, the support portion removing step as a post-treatment is performed for the stacked body, whereby the target three-dimensional shaped article 10 is obtained.

Incidentally, in the configuration shown in the drawings, for facilitating understanding, the description has been made under the assumption that the respective steps described above are sequentially performed, however, different steps may be concurrently performed at the respective sites in the shaping region (a space on the stage).

Further, in the configuration shown in the drawings, the description has been made under the assumption that one layer 1 is formed by performing the above-mentioned series of steps once, however, the above-mentioned series of steps may be repeatedly performed for forming one layer. For example, one layer may be formed by performing the steps from the layer forming step (second pattern forming step) to the joining step for the entity portion forming composition 2B' after the steps from the layer forming step (first pattern forming step) to the joining step for the support portion forming composition 2A'.

According to the production method as described above, scattering of the particles 21 or the like in the production process for the three-dimensional shaped article 10 or formation of a void (a pore or a cavity) inside the three-dimensional shaped article 10 can be effectively prevented, and the three-dimensional shaped article 10 having excellent reliability (dimensional accuracy, strength, etc.) can be efficiently produced.

Three-Dimensional Shaped Article Producing Composition

Next, the three-dimensional shaped article producing composition used in the production method of the above-mentioned embodiment will be described.

When a plurality of types of three-dimensional shaped article producing compositions 2' are used in the production of the three-dimensional shaped article 10, at least one type of three-dimensional shaped article producing composition 2' may be a composition satisfying the above-mentioned condition (a relation of $D_s/D_{50}<5.0$) with the layer 1 formed in the layer forming step. Particularly, it is preferred that at least the entity portion forming composition 2B' is a composition satisfying the above-mentioned condition (a relation of $D_s/D_{50}<5.0$) with the layer 1 formed in the layer forming step, and it is more preferred that the entity portion forming composition 2B' and the support portion forming composition 2A' are compositions satisfying the above-mentioned condition (a relation of $D_s/D_{50}<5.0$) with the layer 1 formed in the layer forming step.

According to this, the three-dimensional shaped article having excellent reliability (dimensional accuracy, strength, etc.) can be produced.

In this embodiment, as the three-dimensional shaped article producing composition, the entity portion forming composition 2B' and the support portion forming composition 2A' are used.

Entity Portion Forming Composition

First, the entity portion forming composition 2B' as the three-dimensional shaped article producing composition used for producing the three-dimensional shaped article 10 will be described.

The constituent component or the like of the entity portion forming composition 2B' is not particularly limited as long as the composition can be used for forming the entity portion 4 (forming the second pattern 2B), however, the composition preferably contains a plurality of particles 21B (main material particles), and satisfies the above-mentioned condition (a relation of $D_s/D_{50}<5.0$) with the layer 1 formed in the layer forming step.

In the following description, a case where the entity portion forming composition 2B' contains a plurality of particles 21B, and satisfies the above-mentioned condition (a relation of $D_s/D_{50}<5.0$) with the layer 1 formed in the layer forming step will be representatively described.

Particles

By including a plurality of particles 21B in the entity portion forming composition 2B', the range of choice of the constituent material of the three-dimensional shaped article 10 can be expanded, and the three-dimensional shaped article 10 having desired physical properties, texture, and the like can be favorably obtained. For example, when the three-dimensional shaped article is produced using a material dissolved in a solvent, there are limitations on the material that can be used, however, by using the entity portion forming composition 2B' containing the particles 21B, such limitations can be eliminated.

As the constituent material of the particles 21B contained in the entity portion forming composition 2B', for example, a metal material, a metal compound (a ceramic or the like), a resin material, a pigment, etc. are exemplified.

The entity portion forming composition 2B' preferably contains metal particles constituted by a material containing a metal material.

According to this, for example, the texture (high-quality texture and massive texture), mechanical strength, toughness, durability, and the like of the three-dimensional shaped article 10 can be further improved. In addition, heat transfer when energy for joining the particles 21B is applied efficiently proceeds, and therefore, while improving the productivity of the three-dimensional shaped article 10, the occurrence of an undesirable variation in temperature at the respective sites can be more effectively prevented, and the reliability of the three-dimensional shaped article 10 can be further improved.

As the metal material constituting the particles 21B, for example, magnesium, iron, copper, cobalt, titanium, chromium, nickel, aluminum, an alloy containing at least one type among these (for example, a maraging steel, a stainless steel, cobalt-chromium-molybdenum, a titanium alloy, a nickel-based alloy, an aluminum alloy, or the like), etc. are exemplified.

As the metal compound constituting the particles 21B, for example, various metal oxides such as silica, alumina, titanium oxide, zinc oxide, zirconium oxide, tin oxide, magnesium oxide, and potassium titanate; various metal hydroxides such as magnesium hydroxide, aluminum hydroxide, and calcium hydroxide; various metal nitrides such as silicon nitride, titanium nitride, and aluminum nitride; various metal carbides such as silicon carbide and titanium carbide; various metal sulfides such as zinc sulfide; various metal carbonates such as calcium carbonate and magnesium carbonate; various metal sulfates such as calcium sulfate and magnesium sulfate; various metal silicates such as calcium silicate and magnesium silicate; various metal phosphates such as calcium phosphate; various metal borates such as aluminum borate and magnesium borate; composites of these materials; etc. are exemplified.

As the resin material constituting the particles 21B, for example, polybutylene terephthalate, polyethylene terephthalate, polypropylene, polystyrene, syndiotactic polystyrene, polyacetal, modified polyphenylene ether, polyether ether ketone, polycarbonate, an acrylonitrile-butadiene-styrene copolymer (ABS resin), polyether nitrile, a polyamide (nylon or the like), polyarylate, polyamideimide, polyetherimide, polyimide, a liquid crystal polymer, polysulfone, polyethersulfone, polyphenylene sulfide, a fluororesin, etc. are exemplified.

The shape of the particle 21B is not particularly limited, and may be any shape such as a spherical shape, a spindle shape, a needle shape, a cylindrical shape, or a scale-like shape, and further, it may be an irregular shape, but is preferably a spherical shape.

The average particle diameter of the particles 21B is not particularly limited, but is preferably 0.1 µm or more and less than 50 µam, more preferably 0.2 µm or more and 20 µm or less, furthermore preferably 0.3 µm or more and 10 µm or less.

According to this, an effect as described above is more remarkably exhibited, and while improving the productivity of the three-dimensional shaped article 10, the reliability (dimensional accuracy, strength, etc.) of the three-dimensional shaped article 10 to be produced can be further improved.

On the other hand, when the average particle diameter of the particles 21B is less than the above-mentioned lower limit, the fluidity of the entity portion forming composition 2B' is decreased, and the ease of handling of the entity portion forming composition 2B' is decreased, and also the productivity of the three-dimensional shaped article 10 is decreased. Further, scattering of the particles or the like when being irradiated with the laser beam L is likely to occur, and the dimensional accuracy of the three-dimensional shaped article 10 is likely to be deteriorated, or a void (a pore or a cavity) is likely to be generated inside the three-dimensional shaped article 10. In addition, when the average particle diameter of the particles 21B is particularly small, aggregation of the particles 21B in the entity portion forming composition 2B' is likely to occur, and undesirable irregularities in the surface of the layer 1 are likely to occur at a stage before irradiation with the laser beam L. As a result, the dimensional accuracy of the three-dimensional shaped article 10 is particularly likely to be deteriorated also by together with the effect of scattering of the particles or the like when being irradiated with the laser beam L.

Further, when the average particle diameter of the particles 21B is the above-mentioned upper limit or more, the dimensional accuracy of the three-dimensional shaped article 10 is likely to be deteriorated because of an effect such that irregularities in the surface of the layer 1 due to the size of the particles 21B themselves are likely to occur, or the like. Further, it becomes difficult to sufficiently melt the particles 21B, and a void (a pore or a cavity) is likely to be generated inside the three-dimensional shaped article 10.

Particularly, when the entity portion forming composition 2B' contains metal particles constituted by SUS 316L as the particles 21B, the volume-based average particle diameter of the particles 21B is preferably 0.1 µm or more and 10 µm or less, more preferably 0.2 µm or more and 7.0 µm or less, further more preferably 0.3 µm or more and 4.0 µm or less.

According to this, while further improving the productivity of the three-dimensional shaped article 10, the reliability (dimensional accuracy, strength, etc.) of the three-dimensional shaped article 10 to be produced can be further improved.

The Dmax of the particles 21B is preferably 0.2 µm or more and 80 µm or less, more preferably 0.4 µm or more and 40 µm or less, further more preferably 0.5 µm or more and 20 µm or less.

According to this, the fluidity of the entity portion forming composition 2B' becomes more favorable, and therefore, the second pattern forming step can be more smoothly performed, and also the joining of the particles 21B in the joining step can be more favorably performed. As a result, while further improving the productivity of the three-dimensional shaped article 10, the strength of the three-dimensional shaped article 10 to be produced can be further improved, and the occurrence of undesirable irregularities or the like in the three-dimensional shaped article 10 to be produced can be more effectively prevented, and the dimensional accuracy of the three-dimensional shaped article 10 can be further improved.

The content ratio of the particles 21B in the entity portion forming composition 2B' is preferably 30 mass % or more and 95 mass % or less, more preferably 35 mass % or more and 92 mass % or less.

According to this, while further improving the ease of handling of the entity portion forming composition 2B', the amount of components to be removed in the production process for the three-dimensional shaped article 10 can be further reduced, and therefore, it is particularly advantageous in terms of the productivity of the three-dimensional shaped article 10, the production cost thereof, saving resources, and the like. In addition, the dimensional accuracy of the three-dimensional shaped article 10 to be finally obtained can be further improved.

Incidentally, the particles 21B are constituted by a material to undergo a chemical reaction (for example, an oxidation reaction or the like) in the production process for the three-dimensional shaped article 10 (for example, the joining step or the like), and the formulation of the particles 21B contained in the entity portion forming composition 2B' may be different from the formulation of the constituent material of the final three-dimensional shaped article 10.

Further, the entity portion forming composition 2B' may contain two or more types of particles 21B.

Solvent

By including the solvent (dispersion medium) in the entity portion forming composition 2B', the particles 21B can be favorably dispersed in the entity portion forming composition 2B', and the ejection of the entity portion forming composition 2B' by a dispenser or the like can be stably performed.

The solvent is not particularly limited as long as it has a function (a function as the dispersion medium) to disperse the particles 21B in the entity portion forming composition 2B', however, for example, water; ethers such as ethylene glycol monomethyl ether, ethylene glycol monoethyl ether, propylene glycol monomethyl ether, propylene glycol monoethyl ether, diethyl diglycol, and diethylene glycol monobutyl ether acetate; acetate esters such as ethyl acetate, n-propyl acetate, iso-propyl acetate, n-butyl acetate, and iso-butyl acetate; carbitols such as carbitol and an ester compound thereof (for example, carbitol acetate or the like); cellosolves such as cellosolve and an ester compound thereof (for example, cellosolve acetate or the like); aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as monohydric alcohols such as ethanol, propanol, and butanol, and polyhydric alcohols such as ethylene glycol, propylene glycol, butanediol, and glycerin; sulfoxide-based solvents such as dimethyl sulfoxide and diethyl sulfoxide; pyridine-based solvents such as pyridine, picoline (α-picoline, β-picoline, and γ-picoline), and 2,6-lutidine; and ionic liquids such as a tetraalkylammonium acetate (for example, tetrabutylammonium acetate or the like); etc. are exemplified, and one type or two or more types in combination selected from these can be used.

The content of the solvent in the entity portion forming composition 2B' is preferably 5 mass % or more and 70 mass % or less, more preferably 8 mass % or more and 65 mass % or less.

According to this, while further improving the ease of handling of the entity portion forming composition 2B', the productivity of the three-dimensional shaped article 10 can be further improved, and also it is particularly advantageous also in terms of the production cost, saving resources, and the like. Further, the dimensional accuracy of the three-dimensional shaped article 10 to be finally obtained can be further improved.

Binder

The entity portion forming composition 2B' may contain a binder having a function to temporarily bind the particles 21B to one another in a state where the solvent is removed.

By including the binder in the entity portion forming composition 2B', for example, undesirable deformation of the second pattern 2B formed using the entity portion forming composition 2B' can be more effectively prevented. Further, undesirable scattering of the particles 21B or a molten material thereof when being irradiated with the laser beam L in the joining step can be more effectively prevented. According to this, the occurrence of undesirable irregularities in the surface of the layer 1 in which the joined portion 3 is formed can be more effectively prevented. As a result, the dimensional accuracy of the three-dimensional shaped article 10 can be further improved.

The binder may be any as long as it has a function to temporarily fix the particles 21B in the entity portion forming composition 2B' (second pattern 2B) before being subjected to the joining step, and for example, various resin materials such as a thermoplastic resin and a curable resin, and the like can be used.

When a curable resin is contained, a curing reaction of the curable resin may be performed at a timing after ejection of the entity portion forming composition 2B' and before the joining step.

According to this, undesirable deformation of the second pattern 2B formed using the entity portion forming composition 2B' can be more effectively prevented, and the dimensional accuracy of the three-dimensional shaped article 10 can be further improved.

A curing treatment in which the curing reaction of the curable resin is allowed to proceed can be performed by, for example, heating or irradiation with an energy ray such as a UV ray.

As the curable resin, for example, various thermosetting resins, photocurable resins, and the like can be favorably used.

As specific examples of the binder, for example, an acrylic resin, an epoxy resin, a silicone resin, polyvinyl alcohol, PLA (polylactic acid), PA (polyamide), PPS (polyphenylene sulfide), etc. are exemplified.

In the entity portion forming composition 2B', the binder may be contained in any form, however, the entity portion forming composition 2B' preferably contains a component in the form of a liquid (for example, in a molten state, a dissolved state, or the like) as the binder. That is, at least a part of the binder is preferably contained as a constituent component of a dispersion medium.

According to this, the binder can function as a dispersion medium for dispersing the particles 21B, and the preservability of the entity portion forming composition 2B' can be further improved.

Further, the entity portion forming composition 2B' may contain nanocellulose as the binder.

The nanocellulose is a fibrous material that is constituted by cellulose or a derivative of cellulose and that has a width and a thickness of 100 nm or less, and is a concept including a so-called cellulose nanofiber or cellulose nanocrystal.

By including such nanocellulose, the viscosity of the entire entity portion forming composition 2B' can be adjusted within a favorable range at a relatively low content ratio. As a result, for example, even if the content ratio of the particles 21B or the content ratio of the binder other than the nanocellulose in the entity portion forming composition 2B' is not set high, the viscosity of the entity portion forming composition 2B' can be sufficiently increased. Therefore, undesirable deformation of the layer 1 can be prevented while effectively preventing undesirable aggregation of the particles 21B in the entity portion forming composition 2B' or an undesirable variation in formulation or the like in the entity portion forming composition 2B' or in the three-dimensional shaped article 10. On the other hand, the entity portion forming composition 2B' containing nanocellulose has thixotropy, and the viscosity of the entity portion forming composition 2B' decreases in a state where shear stress is applied as when the composition is ejected, and stable ejection can be performed. Further, the amount of the binder contained in the entity portion forming composition 2B' can be reduced, and therefore, the binder or a decomposition product thereof can be more effectively prevented from undesirably remaining in the three-dimensional shaped article 10 to be finally obtained. Further, for the above reasons, the reliability of the three-dimensional shaped article 10 can be further improved.

According to this, an effect as described above is more remarkably exhibited, and while further improving the productivity of the three-dimensional shaped article 10, the reliability of the three-dimensional shaped article 10 to be produced can be further improved.

Incidentally, when the content ratio of the binder in the entity portion forming composition 2B' exceeds the above-mentioned upper limit, the ratio of the particles 21B accounting for the solid content in the entity portion forming composition 2B' is likely to be relatively low and the ratio of decrease in volume due to explosive boil when being irradiated with a laser in the production process for the three-dimensional shaped article 10 is increased, and the dimensional accuracy of the three-dimensional shaped article 10 to be finally obtained is likely to be deteriorated. Further, in the three-dimensional shaped article 10 to be finally obtained, the content ratio of impurities (for example, carbon, etc.) derived from the binder sometimes becomes high.

Other Components

Further, the entity portion forming composition 2B' may contain a component other than the above-mentioned components. As such a component, for example, a polymerization initiator, a dispersant, a surfactant, a thickener, an anti-aggregation agent, a defoaming agent, a slipping agent (leveling agent), a dye, a polymerization inhibitor, a polymerization accelerator, a permeation accelerator, a wetting agent (humectant), a fixing agent, an antifungal agent, a preservative, an antioxidant, a UV absorber, a chelating agent, a pH adjusting agent, etc. are exemplified.

Support Portion Forming Composition

Next, the support portion forming composition 2A' as the three-dimensional shaped article producing composition used for producing the three-dimensional shaped article 10 will be described.

The constituent component or the like of the support portion forming composition 2A' is not particularly limited as long as the composition can be used for forming the support portion 5 (forming the first pattern 2A), however, the composition preferably contains a plurality of particles 21A (main material particles), and satisfies the above-mentioned condition (a relation of $D_s/D_{50}<5.0$) with the layer 1 formed in the layer forming step.

In the following description, a case where the support portion forming composition 2A' contains a plurality of particles 21A, and satisfies the above-mentioned condition (a relation of $D_s/D_{50}<5.0$) with the layer 1 formed in the layer forming step will be representatively described.

Particles

By including a plurality of particles 21A in the support portion forming composition 2A', even when the support portion 5 (first pattern 2A) to be formed has a fine shape or the like, the support portion 5 can be efficiently formed with high dimensional accuracy. Further, the solvent or the binder (including a decomposition product) can be efficiently removed from voids among the plurality of particles 21A constituting the support portion 5, and the productivity of the three-dimensional shaped article 10 can be further improved, and also the reliability of the three-dimensional shaped article 10 can be further improved.

As the constituent material of the particles 21A contained in the support portion forming composition 2A', for example, the same materials as described as the constituent material of the particles 21B of the entity portion forming composition 2B' are exemplified. According to this, the same effect as described above is obtained.

However, the particles 21A constituting the support portion forming composition 2A' are preferably constituted by a material having a higher melting point than the particles 21B constituting the entity portion forming composition 2B'.

The shape of the particle 21A is not particularly limited, and may be any shape such as a spherical shape, a spindle shape, a needle shape, a cylindrical shape, or a scale-like shape, and further, it may be an irregular shape, but is preferably a spherical shape.

The average particle diameter of the particles 21A is not particularly limited, but is preferably 0.1 µm or more and less than 50 µam, more preferably 0.2 µm or more and 20 µm or less, furthermore preferably 0.3 µm or more and 10 µm or less.

According to this, an effect as described above is more remarkably exhibited, and while further improving the productivity of the three-dimensional shaped article 10, the reliability of the three-dimensional shaped article 10 to be produced can be further improved.

On the other hand, when the average particle diameter of the particles 21A is less than the above-mentioned lower limit, the fluidity of the support portion forming composition 2A' is decreased, and the ease of handling of the support portion forming composition 2A' is decreased, and also the productivity of the three-dimensional shaped article 10 is decreased. Further, scattering of the particles or the like when being irradiated with the laser beam L is likely to occur, and the dimensional accuracy of the three-dimensional shaped article 10 is likely to be deteriorated. In addition, when the average particle diameter of the particles 21A is particularly small, aggregation of the particles 21A in the support portion forming composition 2A' is likely to occur, and undesirable irregularities in the surface of the layer 1 are likely to occur at a stage before irradiation with the laser beam L. As a result, the dimensional accuracy of the three-dimensional shaped article 10 is particularly likely to be deteriorated also by together with the effect of scattering of the particles or the like when being irradiated with the laser beam L.

Further, when the average particle diameter of the particles 21A is the above-mentioned upper limit or more, the dimensional accuracy of the three-dimensional shaped article 10 is likely to be deteriorated because of an effect such that irregularities in the surface of the layer 1 due to the size of the particles 21A themselves are likely to occur, or the like.

The Dmax of the particles 21A is preferably 0.2 µm or more and 80 µm or less, more preferably 0.4 µm or more and 40 µm or less, further more preferably 0.5 µm or more and 20 µm or less.

According to this, the fluidity of the support portion forming composition 2A' becomes more favorable, and therefore, supply of the support portion forming composition 2A' can be more smoothly performed. Further, the solvent or the binder (including a decomposition product) can be more efficiently removed from voids among the plurality of particles 21A constituting the support portion 5 (first pattern 2A), and the productivity of the three-dimensional shaped article 10 can be further improved.

The content ratio of the particles 21A in the support portion forming composition 2A' is preferably 30 mass % or more and 95 mass % or less, more preferably 35 mass % or more and 92 mass % or less.

According to this, while further improving the ease of handling of the support portion forming composition 2A', the amount of components to be removed in the production process for the three-dimensional shaped article 10 can be further reduced, and therefore, it is particularly advantageous in terms of the productivity of the three-dimensional shaped article 10, the production cost thereof, saving resources, and the like. In addition, the dimensional accuracy of the three-dimensional shaped article 10 to be finally obtained can be further improved.

Incidentally, the particles 21A are constituted by a material to undergo a chemical reaction (for example, an oxidation reaction or the like) in the production process for the three-dimensional shaped article 10 (for example, the joining step or the like), and the formulation of the particles 21A contained in the support portion forming composition 2A' may be different from the formulation of the constituent material of the final three-dimensional shaped article 10.

Further, the support portion forming composition 2A' may contain two or more types of particles 21A.

Solvent

By including the solvent in the support portion forming composition 2A', the particles can be favorably dispersed in the support portion forming composition 2A', and the ejection of the support portion forming composition 2A' by a dispenser or the like can be stably performed.

As the solvent contained in the support portion forming composition 2A', for example, the same solvents as described as the constituent material of the entity portion forming composition 2B' are exemplified. According to this, the same effect as described above is obtained.

Incidentally, the formulation of the solvent contained in the support portion forming composition 2A' may be the same as or different from the formulation of the solvent contained in the entity portion forming composition 2B'.

The content of the solvent in the support portion forming composition 2A' is preferably 5 mass % or more and 70 mass % or less, more preferably 8 mass % or more and 65 mass % or less.

According to this, while further improving the ease of handling of the support portion forming composition 2A', the amount of components to be removed in the production process for the three-dimensional shaped article 10 can be further reduced, and therefore, it is particularly advantageous in terms of the productivity of the three-dimensional shaped article 10, the production cost thereof, saving resources, and the like. In addition, the dimensional accuracy of the three-dimensional shaped article 10 to be finally obtained can be further improved.

Binder

The support portion forming composition 2A' may contain a binder having a function to temporarily bind the particles 21A to one another in a state where the solvent is removed.

By including the binder in the support portion forming composition 2A', for example, undesirable deformation of the first pattern 2A formed using the support portion forming composition 2A' can be more effectively prevented. Further, undesirable scattering of the particles 21A or a molten material thereof when being irradiated with the laser beam L in the joining step can be more effectively prevented. According to this, the occurrence of undesirable irregularities in the surface of the layer 1 in which the joined portion 3 is formed can be more effectively prevented. As a result, the dimensional accuracy of the three-dimensional shaped article 10 can be improved.

As the binder, for example, the same binders as described as the constituent material of the entity portion forming composition 2B' are exemplified. According to this, the same effect as described above is obtained.

The conditions such as formulation, content ratio, etc. of the binder contained in the support portion forming composition 2A' are preferably, for example, the same conditions as described for the binder contained in the entity portion forming composition 2B'. According to this, the same effect as described above is obtained.

Incidentally, the binder contained in the support portion forming composition 2A' may satisfy the same conditions (for example, formulation, content ratio, etc.) as those of the binder contained in the entity portion forming composition 2B' or may satisfy different conditions.

Other Components

Further, the support portion forming composition 2A' may contain a component other than the above-mentioned components. As such a component, for example, a polymerization initiator, a dispersant, a surfactant, a thickener, an anti-aggregation agent, a defoaming agent, a slipping agent (leveling agent), a dye, a polymerization inhibitor, a polymerization accelerator, a permeation accelerator, a wetting agent (humectant), a fixing agent, an antifungal agent, a preservative, an antioxidant, a UV absorber, a chelating agent, a pH adjusting agent, etc. are exemplified.

Three-Dimensional Shaped Article Producing Composition Set

Next, a three-dimensional shaped article producing composition set according to this embodiment will be described.

The three-dimensional shaped article producing composition set according to this embodiment includes a plurality of types of compositions used for producing a three-dimensional shaped article, and includes a composition that contains a plurality of particles 21, and that satisfies the above-mentioned condition (a relation of $D_s/D_{50}<5.0$) with the layer 1 formed in the layer forming step as at least one type of the compositions.

According to this, the three-dimensional shaped article producing composition set that can effectively prevent scattering of the particles 21 or the like in the production process for the three-dimensional shaped article 10 or formation of a void (a pore or a cavity) inside the three-dimensional shaped article 10, and that can efficiently produce the three-dimensional shaped article 10 having excellent reliability (dimensional accuracy, strength, etc.) can be provided.

The three-dimensional shaped article producing composition set may include at least one type of three-dimensional shaped article producing composition satisfying the conditions as described above, but preferably includes two or more types of three-dimensional shaped article producing compositions satisfying the conditions as described above.

According to this, the reliability of the three-dimensional shaped article 10 can be further improved.

Further, it is preferred that the three-dimensional shaped article producing composition set includes, as the three-dimensional shaped article producing composition 2' satisfying the conditions as described above, at least one type of entity portion forming composition 2B' used for forming the entity portion 4 of the three-dimensional shaped article 10 and also includes at least one type of support portion forming composition 2A' used for forming the support portion 5.

According to this, the reliability of the three-dimensional shaped article 10 can be further improved.

Second Embodiment

FIGS. 12 to 19 are vertical sectional views schematically showing steps of a production method for a three-dimensional shaped article of a second embodiment of the invention. FIG. is a flowchart showing the production method for a three-dimensional shaped article of the second embodiment of the invention.

Hereinafter, the production method for a three-dimensional shaped article of the second embodiment of the invention will be described with reference to these drawings, however, different points from the above-mentioned embodiment will be mainly described, and the description of the same matter will be omitted.

Figure 18:
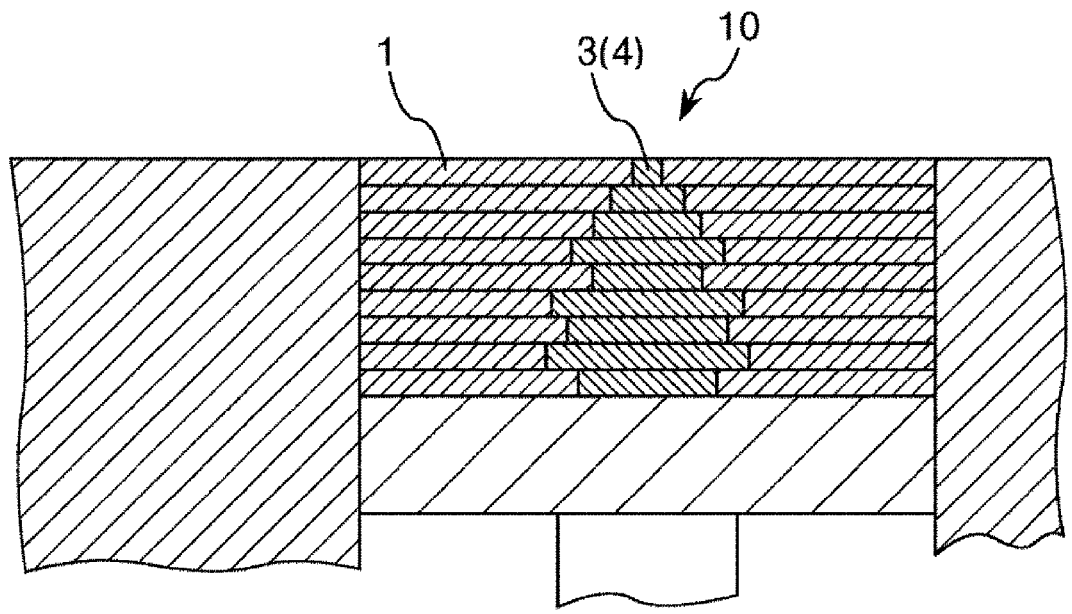
FIG. 18 is a vertical sectional view schematically showing a step of the production method for a three-dimensional shaped article of the second embodiment of the invention.

A production method for a three-dimensional shaped article 10 of this embodiment is a method for producing the three-dimensional shaped article 10 by stacking a plurality of layers 1, and a series of steps including a layer forming step (see FIGS. 12, 13, 15, and 16) of forming a layer 1 by flattening a three-dimensional shaped article producing composition (composition) 2' containing a plurality of particles 21 with a flattening unit M8, and a joining step (see FIGS. 14 and 17) of partially joining the particles 21 contained in the layer 1 to one another by irradiating the layer 1 with a laser beam L in a predetermined pattern is repeatedly performed (see FIG. 18). That is, in the above-mentioned embodiment, the layer 1 is formed by ejecting the three-dimensional shaped article producing composition 2' (the layer 1 is formed by an ejection method), however, in this embodiment, the three-dimensional shaped article producing composition 2' first supplied on a composition mounting portion (composition temporary placing portion) M7 (see FIGS. 12 and 15) is flattened with the flattening unit M8 (see FIGS. 13 and 16), thereby forming the layer 1.

In this manner, by using the flattening unit M8, the number of scanning treatments for forming the layer 1 in which a joined portion 3 is provided can be reduced, and the productivity of the three-dimensional shaped article 10 can be further improved. More specifically, in the above-mentioned embodiment, scanning is performed when the three-dimensional shaped article producing composition 2' (the support portion forming composition 2A' or the entity portion forming composition 2B') is applied, and when the laser beam L is irradiated onto each of the support portion forming composition 2A' and the entity portion forming composition 2B', however, in this embodiment, it is sufficient to perform scanning only when the laser beam L for joining the particles 21 is irradiated.

Further, in the above-mentioned embodiment, as the three-dimensional shaped article producing composition 2', the support portion forming composition 2A' and the entity portion forming composition 2B' are used, however, in this embodiment, even when a single type of three-dimensional shaped article producing composition 2' is used, even the three-dimensional shaped article 10 having a complicated shape can be favorably produced. Further, by using a single type of three-dimensional shaped article producing composition 2', the three-dimensional shaped article producing composition 2' (particles 21) that was not used for forming the joined portion 3 can be easily recovered and subjected to recycling. More specifically, a separation and purification treatment after recovery of the three-dimensional shaped article producing composition 2' (particles 21) can be omitted or simplified.

Layer Forming Step

Figure 12:
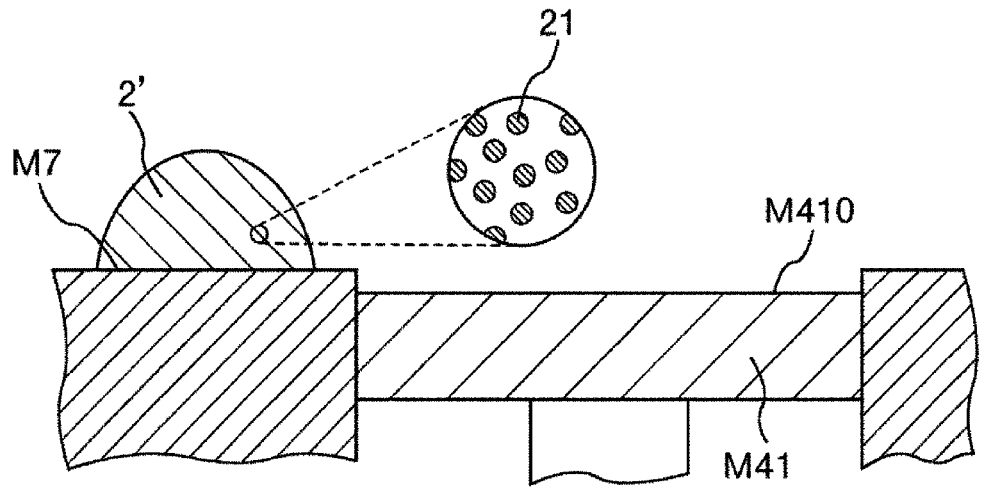
FIG. 12 is a vertical sectional view schematically showing a step (layer forming step) of a production method for a three-dimensional shaped article of a second embodiment of the invention.
Figure 13:
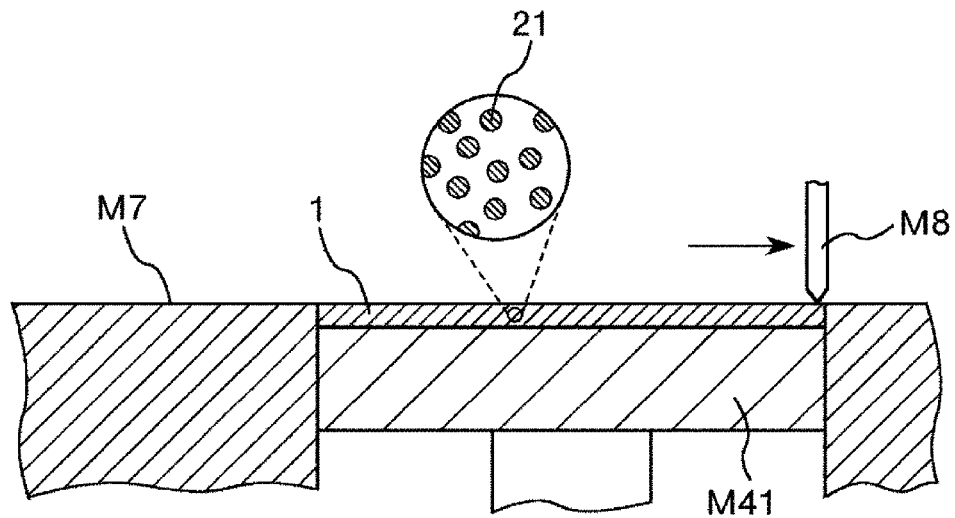
FIG. 13 is a vertical sectional view schematically showing a step (layer forming step) of the production method for a three-dimensional shaped article of the second embodiment of the invention.
Figure 14:
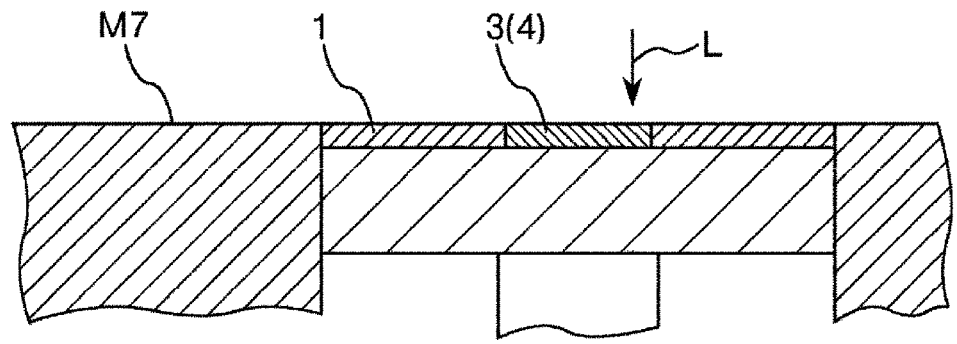
FIG. 14 is a vertical sectional view schematically showing a step (joining step) of the production method for a three-dimensional shaped article of the second embodiment of the invention.
Figure 15:
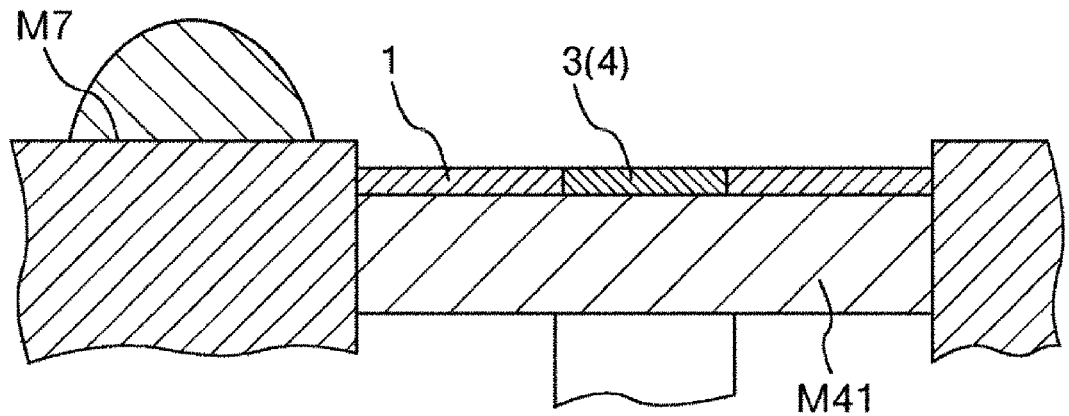
FIG. 15 is a vertical sectional view schematically showing a step (layer forming step) of the production method for a three-dimensional shaped article of a second embodiment of the invention.
Figure 16:
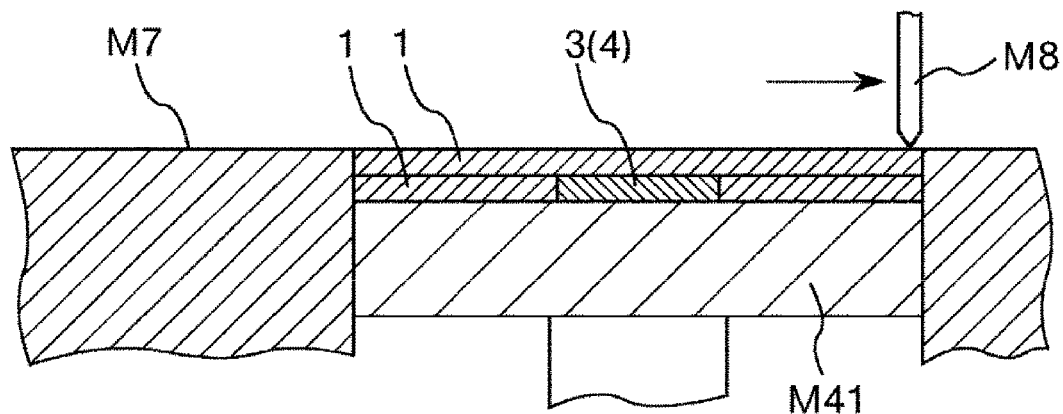
FIG. 16 is a vertical sectional view schematically showing a step (layer forming step) of the production method for a three-dimensional shaped article of the second embodiment of the invention.
Figure 17:
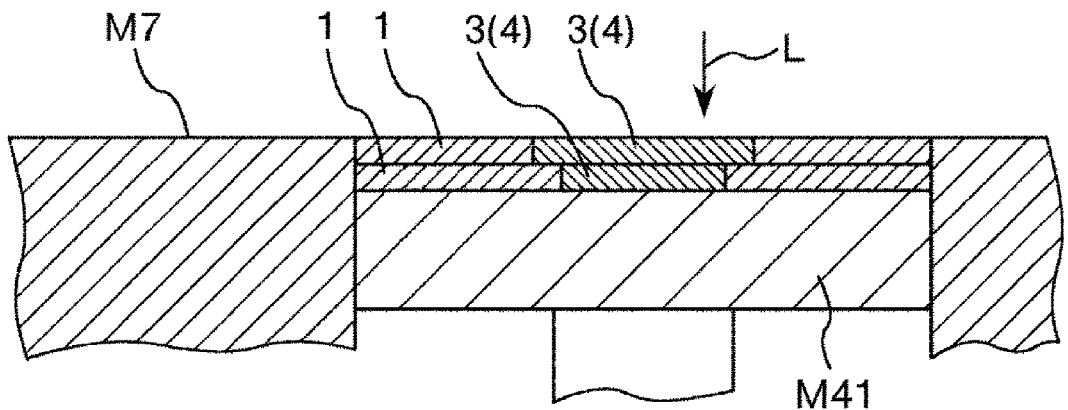
FIG. 17 is a vertical sectional view schematically showing a step (joining step) of the production method for a three-dimensional shaped article of the second embodiment of the invention.

In this embodiment, the layer forming step is performed by first supplying (temporarily placing) the three-dimensional shaped article producing composition 2' on the composition mounting portion (composition temporary placing portion) M7 (see FIGS. 12 and 15), and thereafter flattening the three-dimensional shaped article producing composition 2' with the flattening unit M8 (see FIGS. 13 and 16).

The supply of the three-dimensional shaped article producing composition 2' on the composition mounting portion (composition temporary placing portion) M7 can be performed by, for example, a hopper or the like.

In the configuration shown in the drawings, the flattening unit M8 is a squeegee, but the flattening unit M8 may be any as long as it can form the layer 1 by flattening the three-dimensional shaped article producing composition 2', and may be, for example, a roller or the like.

Particularly, in this embodiment, the three-dimensional shaped article producing composition 2' is supplied to the entire region surrounded by a frame M45 on a stage (lifting stage) M41, and a flat and smooth layer 1 is formed.

According to this, the stability of the shape of the layer 1 is improved, and when the layers 1 are stacked, undesirable collapse of the layers 1 can be effectively prevented. As a result, the dimensional accuracy of the three-dimensional shaped article 10 can be more reliably improved.

Joining Step

The joining step is performed by irradiating (scanning) the layer 1 with a laser beam L in the same manner as in the above-mentioned embodiment, however, in this embodiment, unlike the above-mentioned embodiment, a portion corresponding to the entity portion 4 of the three-dimensional shaped article 10 is selectively irradiated with the laser beam L. According to this, the joined portion 3 is selectively formed in the portion corresponding to the entity portion 4 of the three-dimensional shaped article 10, and the other portion is maintained in a state where the particles 21 are not bound.

In this manner, even if the joined portion 3 is not formed in the portion other than the portion corresponding to the entity portion 4 of the three-dimensional shaped article 10, the layer 1 is formed in the entire region surrounded by the frame M45 on the stage (lifting stage) M41 in this embodiment, and therefore, undesirable deformation of the layer 1 is prevented. Therefore, even if the joined portion 3 is not formed in the portion other than the portion corresponding to the entity portion 4 of the three-dimensional shaped article 10, the dimensional accuracy of the three-dimensional shaped article 10 can be more reliably enhanced. Further, by not forming the joined portion 3 in the portion other than the portion corresponding to the entity portion 4 of the three-dimensional shaped article 10, the three-dimensional shaped article producing composition 2' (particles 21) that was not used for forming the joined portion 3 can be easily recovered and subjected to recycling. More specifically, a separation and purification treatment after recovery of the three-dimensional shaped article producing composition 2' (particles 21) can be omitted or simplified.

Unnecessary Portion Removing Step

Figure 19:
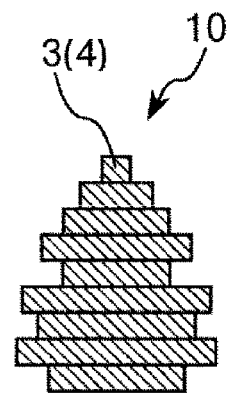
FIG. 19 is a vertical sectional view schematically showing a step (unnecessary portion removing step) of the production method for a three-dimensional shaped article of the second embodiment of the invention.

In this embodiment, after repeatedly performing a series of steps including the layer forming step, the solvent removing step, and the joining step (see FIG. 18), as a post-treatment step, the three-dimensional shaped article producing composition 2' (unnecessary portion) other than the portion corresponding to the entity portion 4 of the three-dimensional shaped article 10 is removed (see FIG. 19). By doing this, the three-dimensional shaped article 10 is taken out.

As a specific method of this step, for example, the same method as described for the support portion removing step of the above-mentioned embodiment (a method in which at least a part of the unnecessary portion is dissolved, a method in which the unnecessary portion is destroyed by smashing or the like, etc.) may be used, however, it is preferred to recover it as a powder.

According to this, the unnecessary portion can be easily recovered, and also the recovered unnecessary portion (particularly, the particles 21 contained in the unnecessary portion) can be favorably subjected to recycling.

As a method for recovering the unnecessary portion as a powder, for example, a method in which the unnecessary portion is brushed off with a brush or the like, a method in which the unnecessary portion is removed by suction, a method in which a gas such as air is blown thereto, a method in which a liquid such as water is applied thereto, a method in which vibration such as ultrasonic vibration is applied thereto, etc. are exemplified. Further, two or more methods selected from these can be performed in combination.

Figure 20:
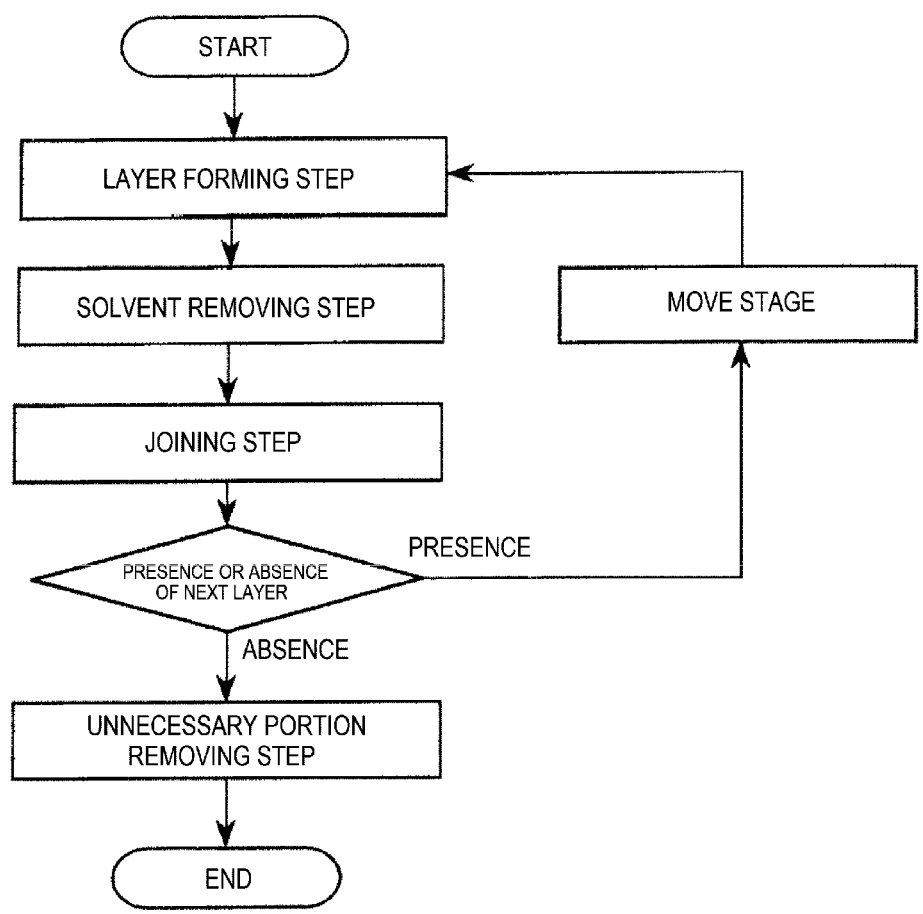
FIG. 20 is a flowchart showing the production method for a three-dimensional shaped article of the second embodiment of the invention.

The production method for the three-dimensional shaped article 10 of this embodiment as described above can be summarized in a flowchart as shown in FIG. 20.

In the production of the three-dimensional shaped article 10 of this embodiment, a series of steps including the layer forming step, the solvent removing step, and the joining step is repeatedly performed as many times as specified, whereby a stacked body in which a plurality of layers 1 are stacked is obtained.

That is, it is determined whether a new layer 1 should be formed on the already formed layer 1, and when there is a layer 1 that should be formed, a new layer 1 is formed, and when there is no layer 1 that should be formed, the unnecessary portion removing step as a post-treatment is performed for the stacked body, whereby the target three-dimensional shaped article 10 is obtained.

Three-Dimensional Shaped Article Producing Composition

Next, the three-dimensional shaped article producing composition 2' used in the production method of the second embodiment will be described.

In the production method of the second embodiment, as the three-dimensional shaped article producing composition 2', the same composition as the entity portion forming composition 2B' described in the above-mentioned first embodiment can be used. According to this, the same effect as described above is obtained.

However, in this embodiment, unlike the first embodiment, excellent ejectability is not required for the three-dimensional shaped article producing composition 2'. Therefore, the three-dimensional shaped article producing composition 2' can be favorably used for forming the layer 1 even if it does not contain a solvent.

When the three-dimensional shaped article producing composition 2' contains a solvent, the content ratio of the solvent in the three-dimensional shaped article producing composition 2' is preferably 1 mass % or more and 70 mass % or less, more preferably 2 mass % or more and 65 mass % or less.

Further, in the production method of the second embodiment, the three-dimensional shaped article producing composition 2' is supplied to the entire region surrounded by the frame M45 on the stage (lifting stage) M41, and the flat and smooth layer 1 is formed, and therefore, even if the three-dimensional shaped article producing composition 2' does not contain a binder, the stability of the shape of the layer 1 can be sufficiently ensured.

When the three-dimensional shaped article producing composition 2' contains a binder, the content ratio of the binder in the three-dimensional shaped article producing composition 2' is preferably 0.1 vol % or more and 7.5 vol % or less, more preferably 0.2 vol % or more and 7.0 vol % or less, further more preferably 0.3 vol % or more and 6.5 vol % or less.

The content ratio of the particles 21 in the three-dimensional shaped article producing composition 2' is preferably 35 mass % or more and 100 mass % or less, more preferably 40 mass % or more and 95 mass % or less.

Three-Dimensional Shaped Article Production Apparatus

Next, a three-dimensional shaped article production apparatus will be described.

First Embodiment

Figure 21:
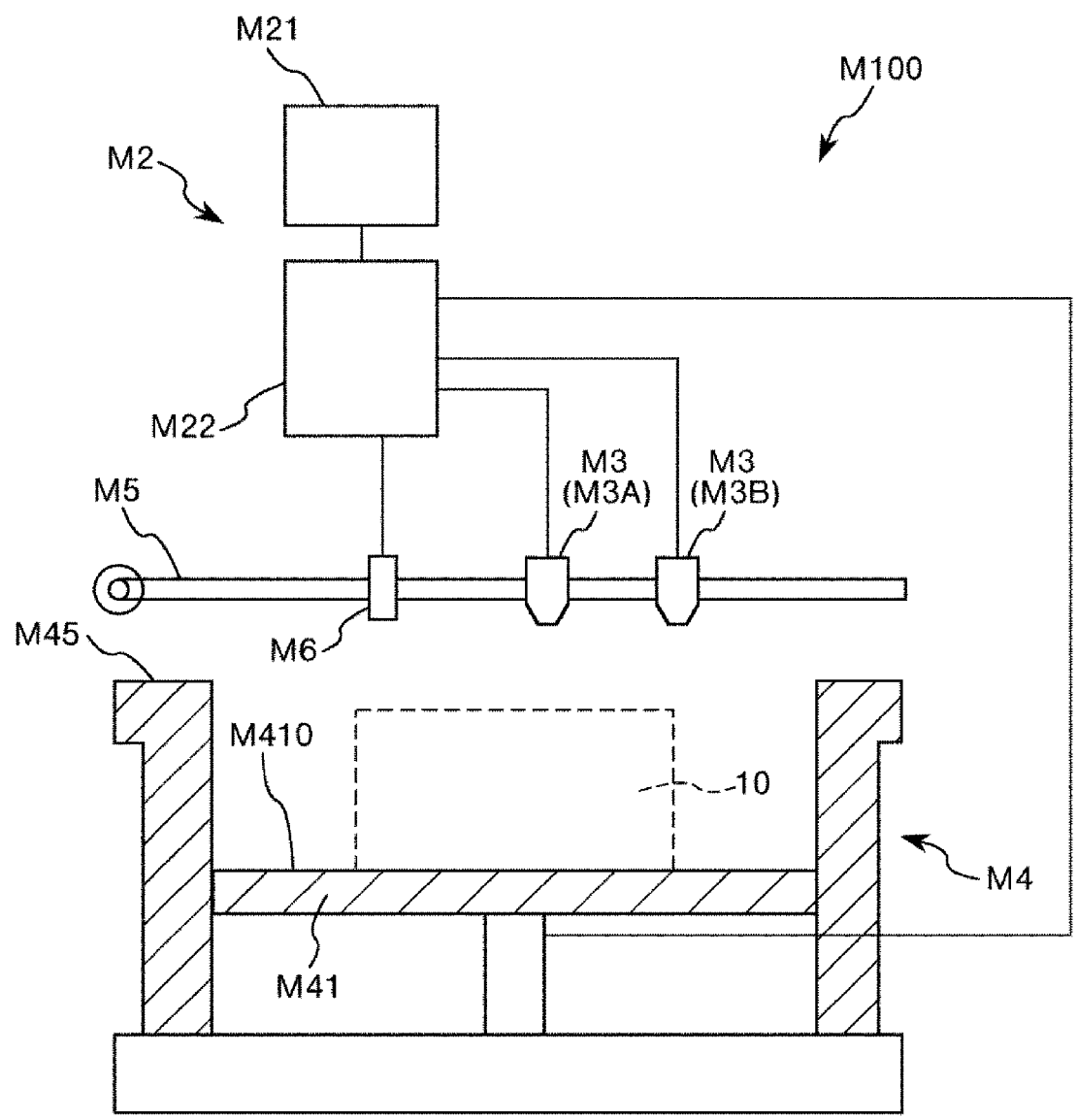
FIG. 21 is a side view schematically showing a first embodiment of a three-dimensional shaped article production apparatus.

FIG. 21 is a side view schematically showing a first embodiment of the three-dimensional shaped article production apparatus.

A three-dimensional shaped article production apparatus M100 of this embodiment includes a nozzle ejecting a three-dimensional shaped article producing composition 2', and a laser beam irradiation unit M6 that irradiates a layer 1 formed by ejecting the three-dimensional shaped article producing composition 2' from the nozzle with a laser beam L, and produces a three-dimensional shaped article 10 by stacking the layer 1.

More specifically, the three-dimensional shaped article production apparatus M100 of this embodiment includes a control unit M2, a composition supply unit (ejection unit) M3 that includes a nozzle ejecting a three-dimensional shaped article producing composition (composition) 2' containing particles 21 in a predetermined pattern, and a laser beam irradiation unit M6 that irradiates the composition 2' supplied in a predetermined pattern with a laser beam L for joining the particles 21.

According to this, the production method for a three-dimensional shaped article of the invention (particularly, the production method for a three-dimensional shaped article according to the first embodiment) as described above can be favorably performed.

The control unit M2 includes a computer M21 and a drive control unit M22.

The computer M21 is a general desktop computer or the like configured to include a CPU, a memory, etc. therein. The computer M21 generates data as model data from the shape of the three-dimensional shaped article 10 and outputs sectional data (slice data) obtained by slicing the data into several parallel layers of thin sectional bodies to the drive control unit M22.

The drive control unit M22 included in the control unit M2 functions as a controlling unit that drives each of the composition supply unit (ejection unit) M3, a layer forming portion M4, the laser beam irradiation unit M6, and the like. Specifically, the drive control unit M22 controls, for example, driving (moving on an X-Y plane or the like) of the composition supply unit (ejection unit) M3, ejection of the composition 2' by the composition supply unit (ejection unit) M3, descending of a stage (lifting stage) M41 movable in the Z direction in FIG. 12 and a descending amount of the stage, and an irradiation pattern, irradiation, a scanning speed, and the like of the laser beam L by the laser beam irradiation unit M6.

To the composition supply unit (ejection unit) M3, a pipe from a material storage portion (material supply portion) (not shown) is coupled. In this material supply portion, the above-mentioned composition 2' is stored and ejected from the composition supply unit (ejection unit) M3 by the control of the drive control unit M22.

The composition supply unit (ejection unit) M3 can move along a guide M5 independently in each of the X direction and the Y direction in FIG. 12.

The layer forming portion M4 includes the stage (lifting stage) M41 that is supplied with the composition 2' and that supports the layer 1 formed using the composition 2', and a frame M45 surrounding the lifting stage M41.

The lifting stage M41 sequentially descends (moves toward the negative direction of the Z axis) by a predetermined amount according to a command from the drive control unit M22 when a new layer 1 is formed (stacked) on the previously formed layer 1.

An upper surface (in more detail, a portion to which the composition 2' is applied) of the stage M41 becomes a flat plane (liquid receiving face) M410. According to this, the layer 1 with high thickness uniformity can be easily and reliably formed.

The stage M41 is preferably constituted by a high-strength material. As the constituent material of the stage M41, for example, various metal materials such as a stainless steel, etc. are exemplified.

Further, to the plane M410 of the stage M41, a surface treatment or a release structure may be applied. According to this, for example, the constituent material of the composition 2' or the like is more effectively prevented from firmly adhering to the stage M41, or the durability of the stage M41 is improved, and thus, stable production of the three-dimensional shaped article 10 over a long period of time can be achieved.

The composition supply unit (ejection unit) M3 is configured to move according to the command from the drive control unit M22 and eject the composition 2' at a desired site on the stage M41 in a predetermined pattern.

The composition supply unit (ejection unit) M3 is configured to eject the composition 2'.

As the composition supply unit (ejection unit) M3, for example, an inkjet head, various dispensers, etc. are exemplified, but it is preferably a dispenser.

According to this, even the composition 2' having a high viscosity can be favorably supplied (ejected), and dripping or the like of the composition 2' after the composition 2' comes in contact with a target site can be more effectively prevented. As a result, the dimensional accuracy of the three-dimensional shaped article 10 to be finally obtained can be further improved. In addition, by using the composition 2' having a high viscosity, the layer 1 having a relatively large thickness can be easily formed, and the productivity of the three-dimensional shaped article 10 can be further improved.

The size (nozzle diameter) of the ejection portion of the composition supply unit (ejection unit) M3 is not particularly limited, but is preferably 10 μm or more and 100 or less.

According to this, while further improving the dimensional accuracy of the three-dimensional shaped article 10, the productivity of the three-dimensional shaped article 10 can be further improved.

The composition supply unit (ejection unit) M3 preferably ejects the composition 2' as a liquid droplet. According to this, the composition 2' can be applied in a fine pattern, and even the three-dimensional shaped article 10 having a fine structure can be produced with particularly high dimensional accuracy and particularly high productivity.

The three-dimensional shaped article production apparatus M100 includes a plurality of composition supply units (ejection units) M3.

According to this, a plurality of types of compositions 2' can be used in combination. More specifically, for example, a plurality of types of entity portion forming compositions can be used or the entity portion forming composition and the support material forming composition can be used in combination.

Particularly, in the configuration shown in the drawing, as two composition supply units (ejection units) M3, a first composition supply unit (first ejection unit) M3A and a second composition supply unit (second ejection unit) M3B are included.

According to this, for example, two types of entity portion forming compositions can be used, or one type of entity portion forming composition and one type of support material forming composition can be used in combination, and so on.

Further, by adopting a configuration in which the composition 2' of the same type is supplied from different composition supply units (ejection units) M3, the productivity of the three-dimensional shaped article 10 can be further improved.

In the following description, a case where one type of entity portion forming composition and one type of support material forming composition are used in combination will be mainly described.

The laser beam irradiation unit M6 has a function to irradiate (scan) the composition 2' with the laser beam L for joining the particles 21 contained in the composition 2' after the composition 2' comes in contact with a target site.

According to this, the particles 21 contained in the composition 2' are joined and a joined portion 3 can be formed. Particularly, by scanning the pattern of the composition 2' containing the particles 21 with the laser beam L, energy can be selectively applied to the composition 2', and the energy efficiency for formation of the joined portion 3 can be further improved. According to this, joining of the particles 21 or the removal of the binder or the like can be more efficiently performed, and the productivity of the three-dimensional shaped article 10 can be further improved. In addition, the energy efficiency can be improved, and therefore, it is also advantageous in terms of saving energy.

In the invention, the production of the three-dimensional shaped article 10 may be performed in a chamber in which the formulation of an atmosphere or the like is controlled. According to this, for example, the joining step can be performed in an inert gas, and undesirable degeneration or the like of the particles can be more effectively prevented. Further, for example, by performing the joining step in an atmosphere containing a reactive gas, the three-dimensional shaped article 10 constituted by a material having a different formulation from the formulation of the particles used as a raw material can be favorably produced.

Second Embodiment

Figure 22:
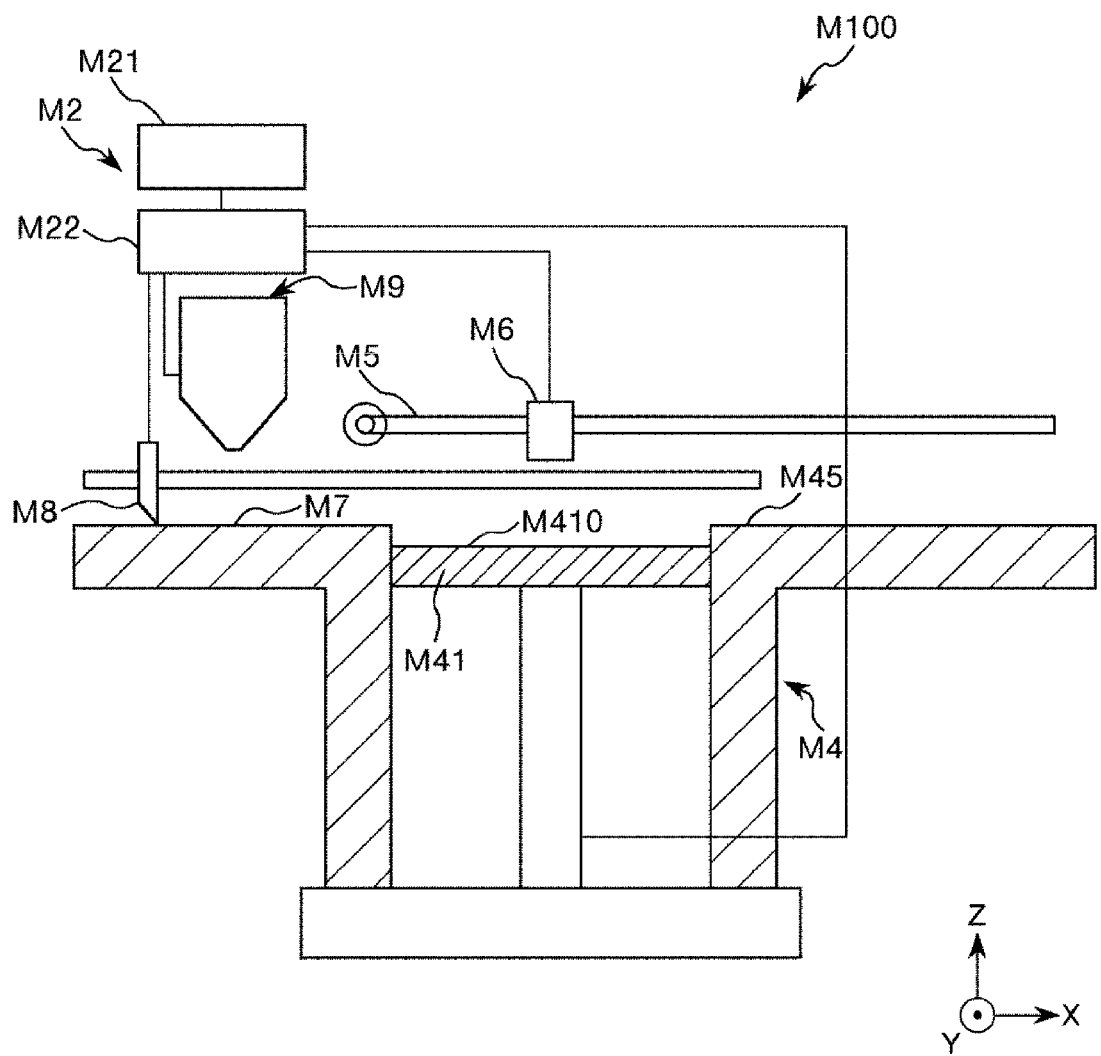
FIG. 22 is a side view schematically showing a second embodiment of a three-dimensional shaped article production apparatus.

FIG. 22 is a side view schematically showing a second embodiment of the three-dimensional shaped article production apparatus.

Hereinafter, the three-dimensional shaped article production apparatus of the second embodiment will be described with reference to this drawing, however, different points from the above-mentioned embodiment will be mainly described, and the description of the same matter will be omitted.

A three-dimensional shaped article production apparatus M100 of this embodiment includes a composition supply unit M9 that houses a three-dimensional shaped article producing composition 2', a flattening unit M8 that flattens the three-dimensional shaped article producing composition 2' supplied from the composition supply unit M9, thereby forming a layer 1, and a laser beam irradiation unit M6 that irradiates the layer 1 with a laser beam L, and produces a three-dimensional shaped article 10 by stacking the layer 1.

More specifically, the three-dimensional shaped article production apparatus M100 of this embodiment includes a control unit M2, a composition supply unit M9 that houses the composition 2' containing particles 21, a composition mounting portion (composition temporary placing portion) M7 in which the composition 2' supplied from the composition supply unit M9 is mounted (temporarily placed), a flattening unit M8 that flattens the composition 2' mounted in the composition mounting portion M7 while moving the composition 2' to the stage M41, thereby forming a layer 1, and a laser beam irradiation unit M6 that irradiates the layer 1 with a laser beam L in a predetermined pattern, and produces a three-dimensional shaped article 10 by stacking the layer 1.

According to this, the production method for a three-dimensional shaped article of the invention (particularly, the production method for a three-dimensional shaped article according to the second embodiment) as described above can be favorably performed.

In this embodiment, a drive control unit M22 included in the control unit M2 functions as a controlling unit that drives each of the composition supply unit M9, the flattening unit M8, a layer forming portion M4, the laser beam irradiation unit M6, and the like.

The composition supply unit M3 houses the three-dimensional shaped article producing composition (composition) 2' inside and is configured to move according to the command from the drive control unit M22 and supply the composition 2' housed inside to the composition mounting portion (composition temporary placing portion) M7.

The flattening unit M8 has an elongated shape extending in the Y direction and is a squeegee including a blade in which a lower tip has a sharp edge shape.

The length in the Y direction of the blade is larger than the width (length in the Y direction) of the stage M41 (shaping region).

Incidentally, the three-dimensional shaped article production apparatus M100 may include a vibration mechanism (not shown) for applying micro-vibration to the blade so that diffusion of the composition 2' (formation of the layer 1) with the flattening unit (squeegee) M8 can be smoothly performed.

The frame M45 has a function to support the side faces of the layer 1 formed on the stage M41. Further, it also has a function to define the area of the layer 1 when forming the layer 1.

The frame M45 is preferably constituted by a high-strength material. As the constituent material of the frame M45, for example, various metal materials such as a stainless steel, etc. are exemplified.

Three-Dimensional Shaped Article

The three-dimensional shaped article according to the invention is produced using the production method for a three-dimensional shaped article of the invention as described above.

According to this, the three-dimensional shaped article having excellent reliability can be produced.

The use of the three-dimensional shaped article is not particularly limited, however, for example, an appreciation article and an exhibit such as a doll and a figure; a medical device such as an implant; etc. are exemplified.

In addition, the three-dimensional shaped article may be applied to any of a prototype, a mass-produced product, and a custom-made product.

Hereinabove, preferred embodiments of the invention are described, however, the invention is not limited thereto.

For example, in the three-dimensional shaped article production apparatus used for the production method for a three-dimensional shaped article of the invention, the configuration of each portion can be replaced with an arbitrary configuration exhibiting a similar function, and further, an arbitrary configuration can also be added.

For example, the three-dimensional shaped article production apparatus used for the production method for a three-dimensional shaped article of the invention may include a heating unit that heats a composition to be ejected. According to this, the viscosity of the composition is decreased, and the ejectability can be further improved. In addition, by heating the composition before ejection in advance, the composition after ejection is cooled to increase the viscosity of the composition after ejection, and the stability of the shape of the pattern formed by the composition can be further improved. According to this, the productivity and the dimensional accuracy of the three-dimensional shaped article can be made compatible at a higher level.

Further, the three-dimensional shaped article production apparatus used for the production method for a three-dimensional shaped article of the invention may include a cooling unit (not shown). According to this, for example, the layer after the particles are joined can be rapidly cooled, and the later step can be favorably performed. As a result, the productivity and reliability of the three-dimensional shaped article can be further improved. In addition, the apparatus may include an infrared halogen lamp, a carbon heater, or the like as a solvent removing unit.

Further, in the above-mentioned embodiments, a case where a layer is directly formed in the surface of the stage is representatively described, however, for example, a shaping plate is placed on the stage, and a three-dimensional shaped article may be produced by staking layers on the shaping plate. In such a case, in the production process for the three-dimensional shaped article, the shaping plate and the particles constituting the lowermost layer are joined, and thereafter, the shaping plate may be removed from the target three-dimensional shaped article in a post-treatment. According to this, for example, the occurrence of warpage of the layer in the process for stacking a plurality of layers can be more effectively prevented, and the dimensional accuracy of the three-dimensional shaped article to be finally obtained can be further improved.

Further, in the above-mentioned first embodiment, a case where with respect to a single layer, the second pattern forming step is performed after the first pattern forming step is mainly described, however, in the formation of at least one layer, the order of the first pattern forming step and the second pattern forming step may be reversed. Further, a plurality of types of compositions may be simultaneously applied in different regions.

Further, in the above-mentioned first embodiment, a case where with respect to a single layer, the solvent removing step is performed after performing the first pattern forming step and the second pattern forming step is representatively described, however, for example, the solvent removing step may be separately performed each time after the first pattern forming step and after the second pattern forming step.

Further, in the above-mentioned first embodiment, a case where in the formation of all layers, the first pattern and the second pattern are formed is representatively described, however, a stacked body formed by stacking a plurality of layers may include, for example, a layer that does not have the first pattern or a layer that does not have the second pattern. Further, a layer in which a portion corresponding to the entity portion is not formed (for example, a layer constituted by only the support portion) is formed in a contact face with the stage (right above the stage) and the layer may be made to function as a sacrificial layer.

Further, in the production method for a three-dimensional shaped article of the invention, the order of the steps or treatments is not limited to the order described above, and the steps or treatments may be performed by changing the order of at least some of them.

For example, the order of the first joining step and the second joining step may be changed, or the first joining step and the second joining step may be concurrently performed at different sites in the layer.

Further, in the above-mentioned first embodiment, a case where in the joining step, the joining of the particles contained in the support portion forming composition is not performed together with the joining of the particles contained in the entity portion forming composition is mainly described, however, in the joining step, the joining of the particles contained in the support portion forming composition may be performed together with the joining of the particles contained in the entity portion forming composition.

Further, the support portion may not be formed depending on the shape of the three-dimensional shaped article to be produced.

Further, in the production method for a three-dimensional shaped article of the invention, a pre-treatment step, an intermediate-treatment step, or a post-treatment step may be performed as needed.

As the pre-treatment step, for example, a stage cleaning step, etc. are exemplified.

As the post-treatment step, for example, a washing step, a shape adjusting step in which deburring or the like is performed, a coloring step, a coating layer forming step, a heat treatment step for improving the joining strength between particles, etc. are exemplified.

Further, the production method for a three-dimensional shaped article of the invention is not limited to the method performed by using the three-dimensional shaped article production apparatus as described above.

EXAMPLES

Hereinafter, the invention will be described in more detail with reference to specific examples, however, the invention is not limited only to these examples. Incidentally, in the following description, a treatment for which a temperature condition is not particularly shown was performed at room temperature (25° C.). Further, also with respect to various measurement conditions, when a temperature condition is not particularly shown, a value is obtained at room temperature (25° C.).

Example A1

1. Production of Three-Dimensional Shaped Article Producing Composition

An SUS 316L powder having an average particle diameter of 10 μm: 30 parts by volume and glycerin as a solvent: 70 parts by volume were mixed, whereby an entity portion forming composition as a three-dimensional shaped article producing composition was obtained (see Table 1).

Further, an alumina powder having an average particle diameter of 3 μm: 30 parts by volume and glycerin as a solvent: 70 parts by volume were mixed, whereby a support portion forming composition as a three-dimensional shaped article producing composition was obtained.

By doing this, a three-dimensional shaped article producing composition set composed of the entity portion forming composition and the support portion forming composition was obtained.

2. Production of Three-Dimensional Shaped Article

By using the three-dimensional shaped article producing compositions obtained as described above, a three-dimensional shaped article in a rectangular parallelepiped shape having a designed dimension of 4 mm in thickness, 10 mm in width, and 80 mm in length was produced as follows.

First, a three-dimensional shaped article production apparatus as shown in FIG. 21 was prepared, and the support portion forming composition was ejected as a plurality of liquid droplets in a predetermined pattern on a stage from a nozzle of a dispenser as a first composition supply unit, whereby a first pattern (support portion pattern) was formed (layer forming step (first pattern forming step)).

Subsequently, the entity portion forming composition was ejected as a plurality of liquid droplets in a predetermined pattern on the stage from a nozzle of a dispenser as a second composition supply unit, whereby a second pattern (entity portion pattern) was formed (layer forming step (second pattern forming step)).

By doing this, a layer composed of the first pattern and the second pattern was formed. The thickness of the layer was 26 μm.

Thereafter, the layer composed of the first pattern and the second pattern was subjected to a heating treatment at 250° C., whereby the solvent contained in the layer was removed (solvent removing step).

Thereafter, the first pattern and the second pattern of the layer were sequentially scanned (irradiated) with a laser beam (YAG laser, maximum peak wavelength: 1,064 nm, laser output: 110 W, beam diameter: 100 μm), whereby joining of the particles was performed. By doing this, a first joined portion (support portion) and a second joined portion (entity portion) were formed (joining step). Incidentally, the scanning speed of the laser beam was set to 400 mm/sec.

By repeatedly performing a series of steps including steps from the layer forming step (the first pattern forming step and the second pattern forming step) to the joining step as described above, a stacked body having a shape corresponding to the three-dimensional shaped article to be produced was obtained.

Thereafter, the support portion was removed by suction, whereby the target three-dimensional shaped article was taken out (support portion removing step).

Examples A2 to A4

Three-dimensional shaped article producing compositions (three-dimensional shaped article producing composition sets) and three-dimensional shaped articles were produced in the same manner as in the above-mentioned Example A1 except that the configuration of the entity portion forming composition and the thickness of the layer to be formed in the layer forming step were changed as shown in Table 1, and the irradiation conditions of the laser beam were adjusted.

Comparative Examples A1 to A7

Three-dimensional shaped article producing compositions (three-dimensional shaped article producing composition sets) and three-dimensional shaped articles were produced in the same manner as in the above-mentioned Example A1 except that the configuration of the entity portion forming composition and the thickness of the layer to be formed in the layer forming step were changed as shown in Table 1, and the irradiation conditions of the laser beam were adjusted.

The configurations of the three-dimensional shaped article producing compositions (entity portion forming compositions) of the above-mentioned respective Examples and Comparative Examples are shown together in Table 1. Incidentally, in the table, glycerin is denoted by "Gly".

Further, with respect to a surface (a region corresponding to the entity portion) of a layer (a single layer that is not stacked) obtained by performing the layer forming step, the solvent removing step, and the joining step under the same conditions as the production conditions for each of the three-dimensional shaped articles in the above-mentioned respective Examples and Comparative Examples, the arithmetic average height Sa, maximum height Sz, skewness (degree of asymmetry) Ssk, and kurtosis (degree of peakedness) Sku defined in ISO 25178 were determined. These values determined with respect to the region corresponding to the entity portion are shown together in Table 1. From the values of Ssk and Sku, it is found that when $D_s/D_{50}>5.0$, there is a tendency that the surface roughness distribution of the shaping face rapidly changes into a distribution with sharp skewness.

Further, the values of the viscosity of the support portion forming compositions and the entity portion forming compositions used in the above-mentioned respective Examples were all within a range of 1,000 mPa·s or more and 20,000 mPa·s or less. Further, the values of the volume per liquid droplet of the support portion forming compositions and the entity portion forming compositions in the above-mentioned respective Examples and Comparative Examples were all within a range of 1 nL or more and 50 nL or less. Further, in the above-mentioned respective Examples and Comparative Examples, the values of the content ratio of the solvent in the layer after the solvent removing step were all within a range of 0.5 mass % or more and 20 mass % or less. Further, the values of the Dmax of the particles contained in the support portion forming compositions and the entity portion forming compositions used in the above-mentioned respective Examples were all within a range of 0.2 μm or more and 80 μm or less.

TABLE 1

| | Entity portion forming composition | | | | | | | | | | | | | |
|---|---|---|---|---|---|---|---|---|---|---|---|---|---|---|
| | Particles | | | Solvent | | | Thickness of layer $D_S$ [μm] | $D_S/D_{50}$ | Sa [μm] | Sz [μm] | Sq [μm] | Ssk | Sku |
| | Constituent material | Average particle diameter $D_{50}$ [μm] | Content [mass %] | Content ratio [vol %] | Constituent material | Content [mass %] | Content ratio [vol %] | | | | | | | |
| Example A1 | SUS316L | 10 | 73.1 | 30 | Gly | 73.1 | 70 | 26 | 2.6 | 4.7 | 101.6 | 6.2 | −0.1 | 5.1 |
| Example A2 | SUS316L | 10 | 73.1 | 30 | Gly | 73.1 | 70 | 50 | 5.0 | 4.7 | 101.6 | 6.2 | −0.1 | 5.1 |
| Example A3 | SUS316L | 40 | 73.1 | 30 | Gly | 73.1 | 70 | 92 | 2.3 | 13.0 | 235.4 | 17.5 | 0.9 | 7.0 |
| Example A4 | SUS316L | 40 | 73.1 | 30 | Gly | 73.1 | 70 | 60 | 1.5 | 10.4 | 169.3 | 13.5 | 0.7 | 6.1 |
| Comparative Example A1 | SUS316L | 3.0 | 73.1 | 30 | Gly | 73.1 | 70 | 36 | 12.0 | 8.3 | 291.2 | 12.9 | 2.0 | 22.6 |
| Comparative Example A2 | SUS316L | 3.0 | 73.1 | 30 | Gly | 73.1 | 70 | 58.5 | 19.5 | 19.8 | 529.7 | 34.4 | 3.5 | 20.2 |
| Comparative Example A3 | SUS316L | 3.0 | 73.1 | 30 | Gly | 73.1 | 70 | 108 | 36.0 | 52.6 | 659.0 | 73.4 | 2.0 | 7.4 |
| Comparative Example A4 | SUS316L | 10 | 73.1 | 30 | Gly | 73.1 | 70 | 87 | 8.7 | 11.7 | 450.7 | 21.6 | 4.7 | 40.5 |
| Comparative Example A5 | SUS316L | 3.0 | 73.1 | 30 | Gly | 73.1 | 70 | 25 | 8.3 | 5.8 | 226.1 | 8.6 | 2.0 | 36.4 |
| Comparative Example A6 | SUS316L | 3.0 | 73.1 | 30 | Gly | 73.1 | 70 | 50 | 16.7 | 13.4 | 594.8 | 24.4 | 3.0 | 27.3 |
| Comparative Example A7 | SUS316L | 3.0 | 73.1 | 30 | Gly | 73.1 | 70 | 70 | 23.3 | 17.9 | 454.2 | 34.8 | 4.0 | 22.4 |

3. Evaluation 3.1 Dimensional Accuracy of Three-Dimensional Shaped Article

With respect to the three-dimensional shaped articles of the above-mentioned respective Examples and Comparative Examples, the thickness, width, and length were measured, and the amounts of deviation from the design values were determined and evaluated according to the following criteria.

A: The largest amount of deviation from the design value among the amounts of deviation from the design values of the thickness, width, and length is less than 1.0%.

B: The largest amount of deviation from the design value among the amounts of deviation from the design values of the thickness, width, and length is 1.0% or more and less than 2.0%.

C: The largest amount of deviation from the design value among the amounts of deviation from the design values of the thickness, width, and length is 2.0% or more and less than 4.0%.

D: The largest amount of deviation from the design value among the amounts of deviation from the design values of the thickness, width, and length is 4.0% or more and less than 7.0%.

E: The largest amount of deviation from the design value among the amounts of deviation from the design values of the thickness, width, and length is 7.0% or more.

3.2 Strength

With respect to the three-dimensional shaped articles of the above-mentioned respective Examples and Comparative Examples, measurement was performed under conditions of a distance between supporting points of 64 mm and a testing speed of 2 mm/min according to JIS K 7171:1994 (ISO 178:1993), and the bending strength was evaluated according to the following criteria.

A: The bending strength is 65 MPa or more.

B: The bending strength is 60 MPa or more and less than 65 MPa.

C: The bending strength is 45 MPa or more and less than 60 MPa.

D: The bending strength is 30 MPa or more and less than 45 MPa.

E: The bending strength is less than 30 MPa.

These results are shown together in Table 2.

TABLE 2

| | Dimensional accuracy of three-dimensional shaped article | Strength |
|---|---|---|
| Example A1 | A | A |
| Example A2 | A | A |
| Example A3 | B | A |
| Example A4 | A | A |
| Comparative Example A1 | D | D |
| Comparative Example A2 | E | E |
| Comparative Example A3 | E | E |
| Comparative Example A4 | E | E |
| Comparative Example A5 | D | D |
| Comparative Example A6 | E | E |
| Comparative Example A7 | E | E |

As apparent from Table 2, according to the invention, a three-dimensional shaped article having excellent dimensional accuracy and strength and high reliably could be produced. On the other hand, in Comparative Examples, satisfactory results could not be obtained.

Example B1

4. Preparation of Three-Dimensional Shaped Article Producing Composition

The entity portion forming composition produced in the above-mentioned Example A1 was prepared as a three-dimensional shaped article producing composition of this Example.

5. Production of Three-Dimensional Shaped Article

By using the three-dimensional shaped article producing composition obtained as described above, a three-dimensional shaped article in a rectangular parallelepiped shape having a designed dimension of 4 mm in thickness, 10 mm in width, and 80 mm in length was produced as follows.

First, a three-dimensional shaped article production apparatus as shown in FIG. 22 was prepared, and the three-dimensional shaped article producing was supplied to a composition mounting portion (composition temporary placing portion) from a composition supply unit. Subsequently, by using a squeegee as a flattening unit, the three-dimensional shaped article producing supplied to the composition mounting portion (composition temporary placing portion) was flattened while moving it to a stage M41, whereby a layer was formed (layer forming step). The thickness of the formed layer was 26 μm.

Thereafter, the formed layer was subjected to a heating treatment at 250° C., whereby the solvent contained in the layer was removed (solvent removing step).

Thereafter, the layer was scanned (irradiated) with a laser beam (YAG laser, maximum peak wavelength: 1,064 nm, laser output: 110 W, beam diameter: 100 μm) in a pattern corresponding to the entity portion of the three-dimensional shaped article to be formed to perform joining of the particles, whereby a joined portion (entity portion) was formed (joining step). Incidentally, the scanning speed of the laser beam was set to 400 mm/sec.

By repeatedly performing a series of steps including steps from the layer forming step to the joining step as described above, a stacked body having a shape corresponding to the three-dimensional shaped article to be produced was obtained.

Thereafter, the support portion was removed by suction, whereby the target three-dimensional shaped article was taken out (unnecessary portion removing step).

Examples B2 to B4

The entity portion forming compositions produced in the above-mentioned Examples A2 to A4 were prepared as three-dimensional shaped article producing compositions of Examples B2 to B4, respectively.

Thereafter, three-dimensional shaped articles were produced in the same manner as in the above-mentioned Example B1 except that the thickness of the layer to be formed in the layer forming step was changed as shown in Table 3, respectively, and the irradiation conditions of the laser beam were adjusted.

Comparative Examples B1 to B7

The entity portion forming compositions produced in the above-mentioned Comparative Examples A1 to A7 were prepared as three-dimensional shaped article producing compositions of Comparative Examples B1 to B7, respectively.

Thereafter, three-dimensional shaped articles were produced in the same manner as in the above-mentioned Example B1 except that the thickness of the layer to be formed in the layer forming step was changed as shown in Table 3, respectively, and the irradiation conditions of the laser beam were adjusted.

The configurations of the three-dimensional shaped article producing compositions of the above-mentioned respective Examples and Comparative Examples are shown together in Table 3. Incidentally, in the table, glycerin is denoted by "Gly".

Further, with respect to a surface (a region corresponding to the entity portion) of a layer (a single layer that is not stacked) obtained by performing the layer forming step, the solvent removing step, and the joining step under the same conditions as the production conditions for each of the three-dimensional shaped articles in the above-mentioned respective Examples and Comparative Examples, the arithmetic average height Sa, maximum height Sz, skewness (degree of asymmetry) Ssk, and kurtosis (degree of peakedness) Sku defined in ISO 25178 were determined. These values are shown together in Table 3.

Further, in the above-mentioned respective Examples and Comparative Examples, the values of the content ratio of the solvent in the layer after the solvent removing step were all within a range of 0.5 mass % or more and 20 mass % or less. Further, the values of the Dmax of the particles contained in the three-dimensional shaped article producing compositions used in the above-mentioned respective Examples were all within a range of 0.2 μm or more and 80 μm or less.

TABLE 3

| | Three-dimensional shaped article producing composition | | | | | | | | | | | | | |
|---|---|---|---|---|---|---|---|---|---|---|---|---|---|---|
| | Particles | | | | Solvent | | | Thickness of layer $D_S$ [μm] | $D_S/D_{50}$ | Sa [μm] | Sz [μm] | Sq [μm] | Ssk | Sku |
| | Constituent material | Average particle diameter $D_{50}$ [μm] | Content [mass %] | Content ratio [vol %] | Constituent material | Content [mass %] | Content ratio [vol %] | | | | | | | |
| Example B1 | SUS316L | 10 | 73.1 | 30 | Gly | 73.1 | 70 | 30 | 3.0 | 4.0 | 110.5 | 5.0 | −0.1 | 4.2 |
| Example B2 | SUS316L | 10 | 73.1 | 30 | Gly | 73.1 | 70 | 50 | 5.0 | 4.3 | 105.2 | 6.5 | −0.1 | 5.5 |
| Example B3 | SUS316L | 40 | 73.1 | 30 | Gly | 73.1 | 70 | 100 | 2.5 | 12.0 | 200.4 | 15.5 | 0.4 | 6.9 |
| Example B4 | SUS316L | 40 | 73.1 | 30 | Gly | 73.1 | 70 | 65 | 1.6 | 10.0 | 150.3 | 11.5 | 0.8 | 6.2 |
| Comparative Example B1 | SUS316L | 3.0 | 73.1 | 30 | Gly | 73.1 | 70 | 40 | 13.3 | 9.3 | 300.2 | 15.9 | 3.0 | 25.6 |
| Comparative Example B2 | SUS316L | 3.0 | 73.1 | 30 | Gly | 73.1 | 70 | 60 | 20.0 | 20.8 | 580.7 | 45.4 | 4.5 | 20.9 |

TABLE 3-continued

| | Three-dimensional shaped article producing composition | | | | | | Thickness of layer $D_S$ [μm] | | | | | | |
|---|---|---|---|---|---|---|---|---|---|---|---|---|---|
| | Particles | | | Solvent | | | | | | | | | |
| | Constituent material | Average particle diameter $D_{50}$ [μm] | Content [mass %] | Content ratio [vol %] | Constituent material | Content [mass %] | Content ratio [vol %] | | $D_S/D_{50}$ | Sa [μm] | Sz [μm] | Sq [μm] | Ssk | Sku |
| Comparative Example B3 | SUS316L | 3.0 | 73.1 | 30 | Gly | 73.1 | 70 | 110 | 36.7 | 55.6 | 650.0 | 85.4 | 2.5 | 8.4 |
| Comparative Example B4 | SUS316L | 10 | 73.1 | 30 | Gly | 73.1 | 70 | 90 | 9.0 | 12.7 | 508.7 | 25.6 | 4.6 | 42.5 |
| Comparative Example B5 | SUS316L | 3.0 | 73.1 | 30 | Gly | 73.1 | 70 | 30 | 10.0 | 6.8 | 230.1 | 13.6 | 2.1 | 40.4 |
| Comparative Example B6 | SUS316L | 3.0 | 73.1 | 30 | Gly | 73.1 | 70 | 50 | 16.7 | 12.4 | 600.8 | 22.4 | 3.1 | 25.3 |
| Comparative Example B7 | SUS316L | 3.0 | 73.1 | 30 | Gly | 73.1 | 70 | 70 | 23.3 | 19.9 | 554.3 | 39.8 | 2.9 | 28.4 |

6. Evaluation 6.1 Dimensional Accuracy of Three-Dimensional Shaped Article

With respect to the three-dimensional shaped articles of the above-mentioned respective Examples and Comparative Examples, the thickness, width, and length were measured, and the amounts of deviation from the design values were determined and evaluated according to the following criteria.

A: The largest amount of deviation from the design value among the amounts of deviation from the design values of the thickness, width, and length is less than 1.0%.

B: The largest amount of deviation from the design value among the amounts of deviation from the design values of the thickness, width, and length is 1.0% or more and less than 2.0%.

C: The largest amount of deviation from the design value among the amounts of deviation from the design values of the thickness, width, and length is 2.0% or more and less than 4.0%.

D: The largest amount of deviation from the design value among the amounts of deviation from the design values of the thickness, width, and length is 4.0% or more and less than 7.0%.

E: The largest amount of deviation from the design value among the amounts of deviation from the design values of the thickness, width, and length is 7.0% or more.

6.2 Strength

With respect to the three-dimensional shaped articles of the above-mentioned respective Examples and Comparative Examples, measurement was performed under conditions of a distance between supporting points of 64 mm and a testing speed of 2 mm/min according to JIS K 7171:1994 (ISO 178:1993), and the bending strength was evaluated according to the following criteria.

A: The bending strength is 65 MPa or more.

B: The bending strength is 60 MPa or more and less than 65 MPa.

C: The bending strength is 45 MPa or more and less than 60 MPa.

D: The bending strength is 30 MPa or more and less than 45 MPa.

E: The bending strength is less than 30 MPa.

These results are shown together in Table 4.

TABLE 4

| | Dimensional accuracy of three-dimensional shaped article | Strength |
|---|---|---|
| Example B1 | A | A |
| Example B2 | A | A |
| Example B3 | B | A |
| Example B4 | A | A |
| Comparative Example B1 | D | D |
| Comparative Example B2 | E | E |
| Comparative Example B3 | E | E |
| Comparative Example B4 | E | E |
| Comparative Example B5 | D | D |
| Comparative Example B6 | E | E |
| Comparative Example B7 | E | E |

As apparent from Table 4, according to the invention, a three-dimensional shaped article having excellent dimensional accuracy and strength and high reliably could be produced. On the other hand, in Comparative Examples, satisfactory results could not be obtained.

The entire disclosure of Japanese Patent Application No. 2017-073075 filed on Mar. 31, 2017 is expressly incorporated by reference herein.

The invention claimed is:

1. A production method for a producing a three-dimensional shaped article, the production method comprising:
   a layer forming step of forming a layer using a composition containing a plurality;
   a joining step of joining the plurality of particles contained in the layer to one another by irradiating the layer with a laser beam; and a repeating step of repeating the layer forming step and the layer joining step a plurality of times to stack a plurality of layers to form the three-dimensional shaped article wherein, when an average particle diameter of the particles is represented by $D_{50}$ and a thickness of the layer formed in the layer forming step is represented by $D_s$, a relation of $D_s/D_{50}<5.0$ is satisfied, an arithmetic average height Sa of a surface of the layer in a state where the particles are joined to one another by the joining step is 15 μm or less, and a skewness Ssk of the surface of the layer in the state where the particles are joined to one another by the joining step is in a range of −1.0 to 2.0.

2. The production method according to claim 1, wherein a maximum height Sz of the surface of the layer in the state where the particles are joined to one another by the joining step is 250 μm or less.

3. The production method according to claim 2, wherein the layer is formed by ejecting the composition in the layer forming step.

4. The production method according to claim 3, wherein the thickness Ds of the layer formed in the layer forming step is 5 μm or more and 300 μm or less.

5. The production method according to claim 3, wherein the average particle diameter $D_{50}$ of the particles is 0.1 μm or more and less than 50 μm.

6. The production method according to claim 2, wherein the layer is formed by flattening the composition with a flattening member in the layer forming step.

7. The production method according to claim 6, wherein the thickness Ds of the layer formed in the layer forming step is 5 μm or more and 300 μm or less.

8. The production method according to claim 6, wherein the average particle diameter $D_{50}$ of the particles is 0.1 μm or more and less than 50 μm.

9. The production method according to claim 2, wherein the thickness Ds of the layer formed in the layer forming step is 5 μm or more and 300 μm or less.

10. The production method according to claim 2, wherein the average particle diameter $D_{50}$ of the particles is 0.1 μm or more and less than 50 μm.

11. The production method according to claim 1, wherein the layer is formed by ejecting the composition in the layer forming step.

12. The production method according to claim 11, wherein the thickness Ds of the layer formed in the layer forming step is 5 μm or more and 300 μm or less.

13. The production method according to claim 11, wherein the average particle diameter $D_{50}$ of the particles is 0.1 μm or more and less than 50 μm.

14. The production method according to claim 1, wherein the layer is formed by flattening the composition with a flattening member in the layer forming step.

15. The production method according to claim 14, wherein the thickness Ds of the layer formed in the layer forming step is 5 μm or more and 300 μm or less.

16. The production method according to claim 14, wherein the average particle diameter $D_{50}$ of the particles is 0.1 μm or more and less than 50 μm.

17. The production method according to claim 1, wherein the thickness $D_s$ of the layer formed in the layer forming step is 5 μm or more and 300 μm or less.

18. The production method according to claim 17, wherein the average particle diameter $D_{50}$ of the particles is 0.1 μm or more and less than 50 μm.

19. The production method according to claim 1, wherein the average particle diameter $D_{50}$ of the particles is 0.1 μm or more and less than 50 μm.

\* \* \* \* \*